(12) United States Patent
Kunihiro et al.

(10) Patent No.: US 10,336,366 B2
(45) Date of Patent: Jul. 2, 2019

(54) DRIVING SUPPORT APPARATUS FOR VEHICLE

(71) Applicant: TOYOTA JIDOSHA KABUSHIKI KAISHA, Toyota-shi, Aichi (JP)

(72) Inventors: Yoji Kunihiro, Susono (JP); Yoshio Kudo, Machida (JP); Takahiro Kojo, Gotenba (JP); Yoshiaki Suzuki, Suntou-gun (JP); Masao Ueyama, Mishima (JP); Takeshi Goto, Toyota (JP); Yukihide Kimura, Gotenba (JP); Masateru Amano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 47 days.

(21) Appl. No.: 15/655,343

(22) Filed: Jul. 20, 2017

(65) Prior Publication Data

US 2018/0022383 A1  Jan. 25, 2018

(30) Foreign Application Priority Data

Jul. 21, 2016 (JP) .................. 2016-143343

(51) Int. Cl.
*B62D 6/00* (2006.01)
*B62D 7/15* (2006.01)
(Continued)

(52) U.S. Cl.
CPC ............. *B62D 6/005* (2013.01); *B62D 6/002* (2013.01); *B62D 6/003* (2013.01); *B62D 7/159* (2013.01);
(Continued)

(58) Field of Classification Search
CPC . B60W 40/068; B60W 40/072; B62D 15/025; B62D 6/002; B62D 6/003; B62D 6/005; B62D 7/159
See application file for complete search history.

(56) References Cited

U.S. PATENT DOCUMENTS 6,089,680 A * 7/2000 Yoshioka .............. B60T 8/1755
303/140
6,212,453 B1  4/2001 Kawagoe et al.
(Continued)

FOREIGN PATENT DOCUMENTS

JP  2000-142441 A  5/2000
JP  2015123929 A  7/2015

*Primary Examiner* — Tyler J Lee
(74) *Attorney, Agent, or Firm* — Sughrue Mion, PLLC

(57) ABSTRACT

A driving support apparatus for a vehicle comprising a steering device that steers steerable wheels, and a control unit configured to execute a running control in which a steered angle of the steerable wheels is changed by controlling the steering device, the control unit being configured to calculate a deviation between an index value of a target running state of the vehicle and an index value of an actual running state, to calculate a target change amount of the steered angle based on the index value deviation, to control the steering device so that a change amount of the steered angle conforms to the target change amount, and to limit a magnitude of a time change rate of the steered angle changed by the running control when one of a magnitude of the index value deviation and a magnitude of the target change amount exceeds a reference value.

10 Claims, 22 Drawing Sheets

(51) Int. Cl.
 *B62D 15/02* (2006.01)
 *B60W 40/068* (2012.01)
 *B60W 40/072* (2012.01)

(52) U.S. Cl.
 CPC ......... *B62D 15/025* (2013.01); *B60W 40/068* (2013.01); *B60W 40/072* (2013.01)

(56) References Cited

U.S. PATENT DOCUMENTS

| | | | |
|---|---|---|---|
| 6,615,124 B1 * | 9/2003 | Adachi | B60T 8/1755 180/410 |
| 9,327,765 B2 * | 5/2016 | Takeda | B62D 6/003 |
| 9,550,524 B2 * | 1/2017 | Takeda | B62D 6/008 |
| 2009/0048738 A1 * | 2/2009 | Iwazaki | B62D 1/28 701/44 |
| 2010/0228420 A1 * | 9/2010 | Lee | B62D 1/28 701/26 |
| 2012/0323458 A1 * | 12/2012 | Futamura | B60T 8/1755 701/72 |
| 2014/0129089 A1 * | 5/2014 | Takeuchi | B62D 5/0466 701/41 |
| 2015/0183460 A1 | 7/2015 | Oyama | |
| 2015/0232124 A1 * | 8/2015 | Takeda | B62D 15/025 701/42 |

* cited by examiner

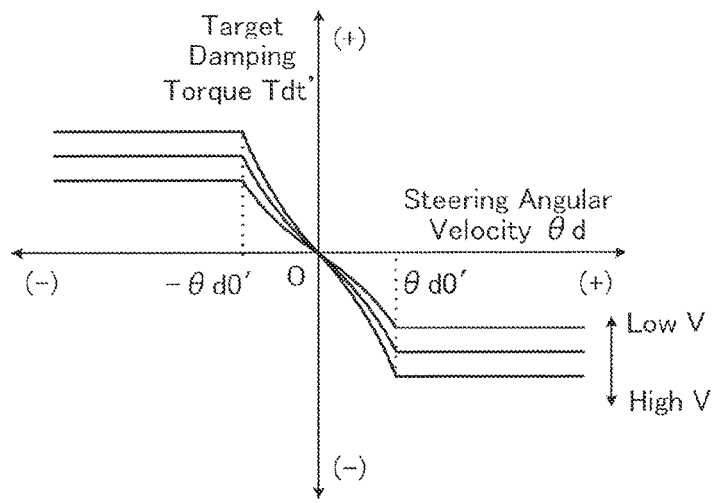
FIG.23
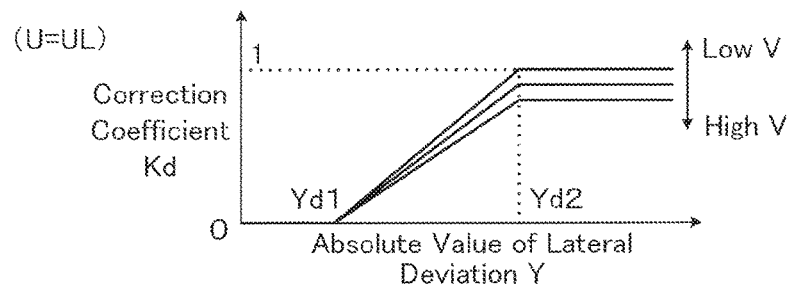
FIG.24J (U=UL)
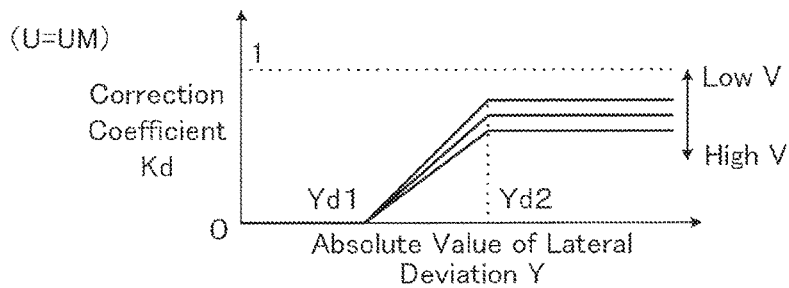
FIG.24K (U=UM)
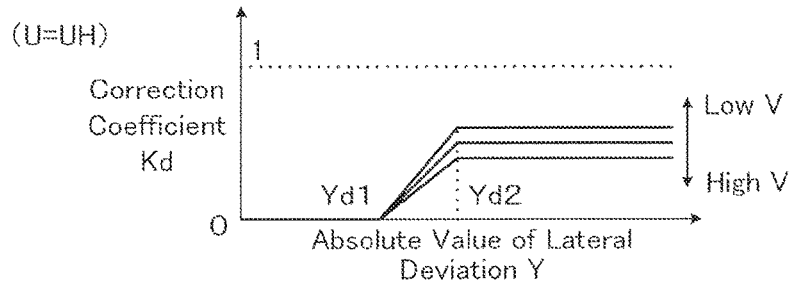
FIG.24L (U=UH)

DRIVING SUPPORT APPARATUS FOR VEHICLE

CROSS-REFERENCE TO RELATED APPLICATION

The disclosure of Japanese Patent Application NO. JP2016-143343 filed on Jul. 21, 2016 is incorporated by reference in its entirety.

BACKGROUND

1. Technical Field

The present disclosure relates to a driving support apparatus for a vehicle that performs running control for controlling a running state of a vehicle with respect to a running road.

2. Description of the Related Art

A driving support apparatus is already well-known that includes a steering device configured to steer steerable wheels, and a control device configured to perform running control that changes the steered angle of the steerable wheels by controlling the steering device so that a running state of the vehicle with respect to the running road conforms to a target running state. The control unit calculates a deviation between an index value of a target running state of the vehicle and an index value of an actual running state, calculates a target change amount of the steered angle of the steerable wheels based on the deviation of the index values, and controls the steering device so that a change amount of the steered angle of the steerable wheels conforms to the target change amount.

The steering device generally includes an electric power steering device that generates a steering assist torque. The steering assist torque includes a basic assist torque calculated based on a steering torque in order to reduce the driver's steering load and an auxiliary assist torque for improving the driver's steering feeling. When the running control is performed, the electric power steering device generates a steering torque (a steering torque of the running control) for changing the steered angle of the steerable wheels by the running control.

When a driver wishes to run the vehicle in a direction different from a running direction of the vehicle set by the running control in a situation where the running control is being performed, the driver performs a steering operation to change the steered angle of the steerable wheels.

Consequently, when steering is performed by the driver during the running control, it is necessary to arbitrate a steering assist torque and a steering torque of the running control. For example, in Japanese Patent Application Laid-open No. 2000-142441, a driving support apparatus configured such that a magnitude of the steering torque of the running control is reduced as a magnitude of the steering torque by the driver is larger. According to this type of driving support apparatus, as compared to where the steering torques are not arbitrated, the running direction of the vehicle can be easily changed to the direction desired by the driver when the driver performs the steering operation during the running control.

When steering operation is performed by a driver during the running control and the steering operation amount at that time is large, a magnitude of a difference between an index value of the target running state of the vehicle with respect to the running road and an index value of an actual running state becomes large. For example, a magnitude of a lateral deviation of the vehicle with respect to the target vehicle trajectory of the running control and a magnitude of a yaw angle deviation, which is an angle formed by a longitudinal direction of the vehicle with respect to the target trajectory, are increased. Also, in a case where torque arbitration is performed as in the driving support apparatus described in Japanese Patent Application Laid-open No. 2000-142441, when the steering by the driver ends, the torque arbitration also ends.

Therefore, when the steering by the driver ends, the steering assist torque decreases under a situation where a magnitude of the target change amount of the steered angle of the steerable wheels based on the deviation of the index values of the running state of the vehicle is large and a magnitude of the steering torque of the running control is large, the steering assist torque decreases. Therefore, since the running state of the vehicle is controlled to the target running state by the steering torque of the running control having a large magnitude, the running state of the vehicle is liable to abruptly change, which may cause an occupant or occupants of the vehicle to feel uncomfortable.

SUMMARY

A main object of the present disclosure is to provide a driving support apparatus for performing running control for controlling a running state of a vehicle with respect to a running road by changing a steered angle of steerable wheels which is improved to prevent the running state of the vehicle from being suddenly changed.

According to the present disclosure, there is provided a driving support apparatus for a vehicle comprising a steering device configured to steer steerable wheels, and a control unit that is configured to execute a running control in which a steered angle of the steerable wheels is changed by controlling the steering device so that a running state of the vehicle with respect to a running road conforms to a target running state; the control unit being configured to calculate a deviation between an index value of a target running state of the vehicle and an index value of an actual running state, to calculate, based on the deviation of the index values, a target change amount of a steered angle of the steerable wheels, and to control the steering device so that a change amount of a steered angle of the steerable wheels conforms to the target change amount.

The control unit is configured to limit a magnitude of a time change rate of the steered angle of the steerable wheels that is changed by the running control when one of the magnitude of the deviation of the Index values and the magnitude of the target change amount of the steered angle exceeds an associated reference value.

According to the above configuration, the deviation between the index value of the target running state of the vehicle and the index value of the actual running state is calculated, and the target change amount of the steered angle of the steerable wheels is calculated based on the deviation of the index values, and the steering device is controlled so that a change amount of the steered angle of the steerable wheels conforms to the target change amount of the steered angle. In particular, when one of the magnitude of the deviation of the index values and the magnitude of the target change amount of the steered angle exceeds the associated reference value, a magnitude of a time change rate of the steered angle of the steerable wheels that is changed by the running control is limited.

Therefore, even if steering is performed by the driver during the running control and a magnitude of the deviation of the index values of the running state and/or a magnitude of the target change amount of the steered angle increases, a magnitude of the time change rate of the steered angle of the steerable wheels which is changed by the running control is limited when one of the magnitude of the deviation and the magnitude of the target change amount exceeds the associated reference value. Accordingly, even in the case where the running control is performed in a situation where the steering by the driver is ended and a magnitude of the target change amount of the steered angle of the steerable wheels based on the deviation of the index values of the running state of the vehicle is large, the steered angle of the steerable wheels can be moderately changed and it is possible to reduce a possibility that the occupant(s) of the vehicle may feel uncomfortable due to abrupt change in the running state of the vehicle.

In one embodiment of the present disclosure, the control unit is configured to calculate a target change amount of a steered angle based on a deviation of the index values whose magnitude is decreasingly corrected when a magnitude of the deviation of the index values exceeds a reference value of the deviation, and wherein the decrease correction amount of the magnitude of the deviation of the index values increases as the magnitude of the deviation of the index values increases.

According to the above aspect, when a magnitude of the deviation of the index values exceeds the reference value of the deviation, a target change amount of the steered angle is calculated based on the deviation of the index values whose magnitude is decreasingly corrected, and the decrease correction amount of the magnitude of the deviation of the index values increases as the magnitude of the deviation of the index values increases.

Consequently, when a magnitude of the deviation of the index values exceeds the reference value of the deviation, a target change amount of the steered angle is calculated based on the deviation of the index values whose magnitude is decreasingly corrected, whereby a magnitude of the target change amount is reduced. Therefore, when a magnitude of the deviation of the index values at the end of the steering by the driver exceeds the reference value of the deviation, a magnitude of the target change amount is reduced, which enables to moderate the change of the steered angle of the steerable wheels controlled on the basis of the target change amount. Further, since the decrease correction amount of the magnitude of the deviation of the index values increases as the magnitude of the deviation of the index values increases, the decrease amount of the magnitude of the target change amount can be increased as the magnitude of the deviation of the index values increases. Accordingly, while preventing the change amount of the steered angle of the steerable wheels from unnecessarily decreasing in a situation where the magnitude of the deviation of the index values is small, it is possible to effectively moderate the change in the steered angle of the steerable wheels in a situation where the magnitude of the deviation of the index values is large.

In another aspect of the present disclosure, the decrease correction amount of the magnitude of the deviation of the index values is larger as a vehicle speed is higher.

According to the above aspect, the decrease correction amount of the magnitude of the deviation of the index values increases as a vehicle speed increases. Therefore, it is possible to effectively control a running state of the vehicle to the target running state in a low vehicle speed range where there is little possibility of a feeling of strangeness rising due to the fact that the movement of the vehicle is fast even when the running state is changed by the running control. Conversely, in a high vehicle speed range, the magnitude of the target change amount can effectively be reduced, so that the change in the running state of the vehicle by the running control is moderated, and it is possible to effectively reduce the risk of occurrence of the discomfort due to the fast movement of the vehicle by the running control.

Further, according to another aspect of the present disclosure, the control unit is configured to decreasingly correct a magnitude of the target change amount of the steered angle based on the target change amount when a magnitude of the target change amount of the steered angle exceeds a reference value of the target change amount, and wherein the decrease amount of the magnitude of the target change amount of the steered angle is larger as a magnitude of the target change amount of the steered angle is larger.

According to the above aspect, when a magnitude of the target change amount of the steered angle exceeds the reference value of the target change amount, a magnitude of the target change amount of the steered angle is decreasingly corrected based on the target change amount of the steered angle, and the decrease correction amount of the magnitude of the target change amount of the steered angle increases as the magnitude of the deviation of the index values increases.

Consequently, when a magnitude of the target change amount of the steered angle exceeds the reference value of the target change amount, a magnitude of the target change amount of the steered angle is reduced based on the target change amount of the steered angle. Therefore, when a magnitude of the target change amount of the steered angle at the end of the steering by the driver exceeds the reference value of the target change amount, a magnitude of the target change amount is reduced, which enables to moderate the change of the steered angle of the steerable wheels controlled on the basis of the target change amount. Further, since the decrease correction amount of the magnitude of the target change amount of the steered angle increases as the magnitude of the target change amount of the steered angle increases, the decrease amount of the magnitude of the target change amount can be increased as the magnitude of the target change amount of the steered angle increases. Accordingly, while preventing the change amount of the steered angle of the steerable wheels from unnecessarily decreasing in a situation where the magnitude of the target change amount of the steered angle is small, it is possible to effectively moderate the change in the steered angle of the steerable wheels in a situation where the magnitude of the target change amount of the steered angle is large.

Furthermore, in another aspect of the present disclosure, the decrease correction amount of the magnitude of the target change amount of the steered angle is larger as a vehicle speed is higher.

According to the above aspect, the decrease correction amount of the magnitude of the target change amount of the steered angle increases as a vehicle speed increases. Therefore, it is possible to effectively control a running state of the vehicle to the target running state in a low vehicle speed range where there is little possibility of a feeling of strangeness rising due to the fact that the movement of the vehicle is fast even when the running state is changed by the running control. Conversely, in a high vehicle speed range, the magnitude of the target change amount can effectively be reduced, so that the change in the running state of the vehicle by the running control is moderated, and it is possible to effectively reduce the risk of occurrence of the discomfort due to the fast movement of the vehicle by the running control.

Further, according to another aspect of the present disclosure, the steering device is configured to generate a driving force for steering the steerable wheels and a drag force resisting steering of the steerable wheels, wherein the control unit is configured to control the steering device based on the deviation of the index values so that, during execution of the running control, a magnitude of the driving force for steering the steerable wheels is increased as a magnitude of the deviation of the index values increases, and to control the steering device so that when a magnitude of the deviation of the index values exceeds the reference value of the deviation, the magnitude of the drag force is larger than that when the magnitude of the deviation of the index values is equal to or smaller than the reference value of the deviation, and wherein a magnitude of the drag force increases as a magnitude of the deviation of the index values increases.

According to the above aspect, during the execution of the running control, the steering device is controlled based on the deviation of the index values so that the greater a magnitude of the deviation of the index values is, the larger a magnitude of the driving force for steering the steerable wheels becomes. In particular, when the magnitude of the deviation of the index values exceeds the reference value of the deviation, the steering device is controlled so that when a magnitude of the deviation of the index values exceeds the reference value of the deviation, a magnitude of the drag force becomes larger than when a magnitude of the deviation of the index values is not more than the reference value of the deviation, and a magnitude of the drag force is larger as a magnitude of the deviation of the index values is larger.

During the running control, a magnitude of the driving force increases as a magnitude of the deviation of the index values increases. However, when a magnitude of the deviation of the index values exceeds the reference value of the deviation, a magnitude of the drag force increases, so that as compared to where a magnitude of the drag force is not increased, it is possible to reduce the increase in the force for steering the steerable wheels accompanying an increase in magnitude of the deviation of the index values and to reduce a magnitude of a time change rate of the steered angle of the steerable wheels. Furthermore, a magnitude of the drag force increases as a magnitude of the deviation of the index values increases. Therefore, while preventing the force for steering the steerable wheels from unnecessarily decreasing in a situation where a magnitude of the deviation of the index values is small, it is possible to effectively reduce an increase in the force for steering the steerable wheels and to effectively reduce a magnitude of the time change rate of the steered angle of the steerable wheels in a situation where a magnitude of the deviation of the index values is large.

Furthermore, in another aspect of the present disclosure, the steering device is a power steering device configured to steer the steerable wheels by generating a steering assist torque, and wherein the control unit is configured to control a magnitude of at least one of a damping torque and a friction torque which are drag force components of the steering assist torque based on the deviation of the index values.

According to the above aspect, the magnitude of at least one of the friction torque and the damping torque which are drag force components of the steering assist torque generated by the power steering device is controlled based on the deviation of the index values. Therefore, when a magnitude of the deviation of the index values exceeds the reference value of the deviation, by increasing a magnitude of at least one of the friction torque and the damping torque on the basis of the deviation of the index values, a magnitude of the time change rate of the steered angle of the steerable wheels can be reduced.

Furthermore, in another aspect of the present disclosure, the control unit is configured to limit the magnitude of the time change rate of the steered angle of the steerable wheels that is changed by the running control when a magnitude of the deviation of the index values exceeds the reference value of the deviation during a period from the end of the driver's steering until a preset termination condition is satisfied during execution of the running control.

According to the above aspect, even when a magnitude of the deviation of the index values exceeds the reference value of the deviation before the start of the steering by the driver and during the steering, the time change rate of the steered angle of the steerable wheels that is changed by the running control is not limited in magnitude. Therefore, while avoiding a steering characteristic from changing due to the fact that a magnitude of the time change rate of the steered angle is limited during steering by the driver, in a situation where a magnitude of the deviation of the index values exceeds the reference value of the deviation when the steering by the driver is ended, the change of the steered angle of the steerable wheels can be moderated.

Furthermore, in another aspect of the present disclosure, the control unit is configured to acquire information on a running road, to set a target trajectory of the vehicle based on the information on the running road, and to calculate as the index value at least one of a lateral deviation of the vehicle with respect to the target trajectory and a yaw angle deviation which is an angle between the target trajectory and a longitudinal direction of the vehicle.

According to the above aspect, a target trajectory of the vehicle is set based on the information on the running road, and at least one of the lateral deviation of the vehicle with respect to the target trajectory and the yaw angle deviation, which is the angle formed by the longitudinal direction of the vehicle with respect to the target trajectory, is calculated as the index value. Therefore, when at least one of a magnitude of the lateral deviation of the vehicle and a magnitude of the yaw angle deviation exceeds the reference value of the deviation, a magnitude of the time change rate of the steered angle of the steerable wheels changed by the running control is limited, which enables to moderate the change of the steered angle of the steerable wheels.

Furthermore, in another aspect of the present disclosure, the control unit is configured to acquire information on a running road, to set a target trajectory of the vehicle based on the information on the running road, to estimate as a first curvature a curvature of a target trajectory at a position where the vehicle exists at a first time point at which the steering operation is completed when the driver's steering operation is terminated during execution of the running control, to estimate as a second curvature one of a curvature of the target trajectory at the position at which the vehicle is estimated to exist at a third time point after a predetermined time has elapsed from a second time point at which it is estimated that the magnitude of the deviation of the index values is equal to or less than an ending reference value and a curvature of the target trajectory at an estimated position where the vehicle is present at a fourth time point at which the vehicle travels a predetermined distance from the second time point, and to reduce a degree of the limit on the magnitude of the time change rate of the steered angle of the steerable wheels as a magnitude of a difference between the second and the first curvatures is larger.

The greater a magnitude of the deviation between the second and the first curvatures is, the greater a magnitude of the change in the index value of the target running state of the vehicle after the second time point is. Therefore, the necessity of bringing the index value of the running state of the vehicle closer to the index value of the target running state by the second time point, in other words, the necessity of relaxing the limitation on the magnitude of the time change rate of the steered angle of the steerable wheels increases as a magnitude of the deviation between the second and the first curvatures increases.

According to the above aspect, when the target trajectory of the vehicle is set based on the information on the running road and the steering operation by the driver is completed during execution of the running control, a curvature of the target trajectory at a position where the vehicle exists at the first point in time at which the steering operation ends is estimated as a first curvature. Also, one of the curvature of the target trajectory at the position where the vehicle is assumed to exist at a third time point and the curvature of the target trajectory at the position at which the vehicle is estimated to exist at a fourth time point is estimated as the second curvature. The third time point is a time point when a predetermined time has elapsed from a second time point at which it is estimated that a magnitude of the deviation of the index values is equal to or less than the end reference value after the first time point. Further, as a magnitude of the deviation between the second and the first curvatures increases, a degree of limitation on the magnitude of the time change rate of the steered angle of the steerable wheels decreases.

Therefore, as the magnitude of the deviation between the second and the first curvatures increases, a degree of limitation on the magnitude of the time change rate of the steered angle of the steerable wheels can be relaxed. It is possible to increase a possibility of bringing the index value of the running state of the vehicle closer to the index value of the target running state by the second time point. Therefore, as compared to where a degree of limitation on the magnitude of the time change rate of the steered angle of the steerable wheels is not reduced as a magnitude of the deviation between the second and the first curvatures increases, it is possible to reduce a possibility that a magnitude of the deviation between the index value of the running state of the target of the vehicle and the index value of an actual running state becomes excessive.

Other objects, other features and attendant advantages of the present disclosure will be readily understood from the description of the embodiments of the present disclosure described with reference to the following drawings.

BRIEF DESCRIPTION OF THE DRAWINGS

FIG. 23 is a diagram showing a map for calculating a target damping torque Tdt' for the LKA control based on a steering angular velocity θd and a vehicle velocity V.

FIGS. 24J to 24L are diagrams showing maps for calculating a correction coefficient Kd for a target damping torque Tdt' for LKA control based on an absolute value of a lateral deviation Y of the vehicle and a vehicle speed V for the cases where the forward urgency degree U is the low urgency (UL), the medium urgency (UM) and the high urgency (UH), respectively.

DETAILED DESCRIPTION

Figure 1:
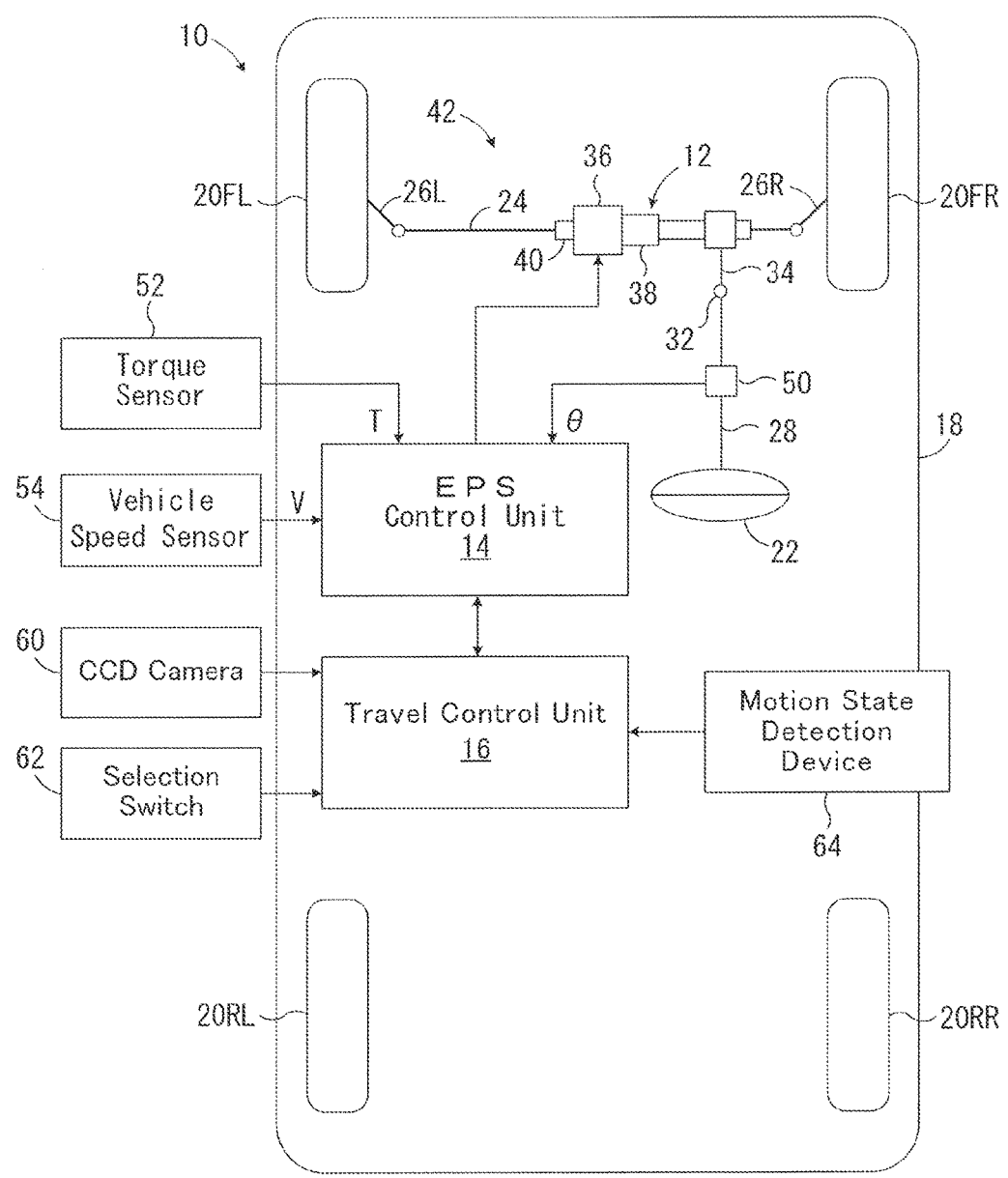
FIG. 1 is a schematic configuration diagram showing a vehicle driving support apparatus according to a first embodiment of the present disclosure.

Preferred embodiments of the present disclosure will now be described in detail with reference to the accompanying drawings.

First Embodiment

A driving support apparatus 10 according to the first embodiment of the present disclosure includes an electric power steering (EPS) device 12, an EPS control unit 14 serving as a control unit for controlling the electric power steering device 12, and a running control unit 16, and is applied to a vehicle 18.

As shown in FIG. 1, the vehicle 18 has left and right front wheels 20FL and 20FR as steerable wheels and right and left rear wheels 20RL and 20RR as non-steerable wheels. The front wheels 20FL and 20FR are steered through a rack bar 24 and tie rods 26L and 26R by the electric power steering device 12 driven in response to an operation of a steering wheel 22 by a driver. The steering wheel 22 is connected to a pinion shaft 34 of the electric power steering device 12 via a steering shaft 28 and a universal joint 32.

In the first embodiment, the electric power steering device 12 is a rack coaxial type electric power steering device and includes an electric motor 36 and a screw type conversion mechanism 38 for converting a rotational torque of the electric motor 36 into a force in the reciprocating direction of the rack bar 24. The electric power steering device 12 generates a force to drive the rack bar 24 with respect to a housing 40, thereby reducing a steering burden of the driver and providing a driving torque for automatically steering the front wheels 20FL and 20FR. The control of the electric power steering device 12 by the EPS control unit 14 will be described later in detail.

As can be understood from the above description, the steering shaft 28, the universal joint 32, the electric power steering device 12, the rack bar 24, the tie rods 26L and 26R, etc. form a steering device 42 for steering the front wheels 20FL and 20FR as necessary. The electric power steering device 12 is adapted to apply a driving force to the rack bar 24, but it may be adapted to apply torque to the steering shaft 28, for example.

In the first embodiment, the steering shaft 28 is provided with a steering angle sensor 50 for detecting a rotation angle of the steering shaft as a steered angle $\theta$. A steering torque sensor 52 for detecting a steering torque T is provided on the pinion shaft 34. The steering torque sensor 52 may be provided on the steering shaft 28. A signal indicating a steered angle $\theta$ and a signal indicating a steering torque T are input to the EPS control unit 14. The vehicle 18 is provided with a vehicle speed sensor 54 for detecting a vehicle speed V. A signal indicating a vehicle speed V is also input to the EPS control unit 14. A steered angle $\theta$ and a steering torque T take positive values in the case of steering in the leftward turning direction of the vehicle. This also applies to computed values such as a target steered angle $\theta$lkat and a target driving assist steering torque Tds which will be described later.

Further, the vehicle 18 is provided with a CCD camera 60 for taking an image in front of the vehicle and a selection switch 62 is provided for selecting whether or not to perform a trajectory control (lane keeping assist control) for running the vehicle along a target course (target trajectory) which is referred to as "LKA control". The selection switch 62 is operated by an occupant of the vehicle and switched between an operation position (ON) where the LKA control is executed by the running control unit 16 and a non-operation position (OFF) where the LKA control is not executed. A signal indicating image information in front of the vehicle taken by the CCD camera 60 and a signal indicating the position (ON or OFF) of the selection switch 62 are input to the running control unit 16.

Signals indicating motion state quantities of the vehicle 18 necessary for driving support control of the vehicle such as a yaw rate, longitudinal and lateral accelerations of the vehicle 18 are also input to the running control unit 16 from the motion state quantity detection device 64. Image information in front of the vehicle and information on a driving lane may be acquired by means other than the CCD camera 60 or may be acquired by a combination of the CCD camera 60 and other device.

The EPS control unit 14 and the running control unit 16 each include a microcomputer having a CPU, a ROM, a RAM, and an input/output port device, which are connected to each other by a bi-directional common bus. The EPS control unit 14 and the running control unit 16 exchange information mutually by communication as necessary. The above configuration of the driving support apparatus 10 according to the first embodiment is the same in the other embodiments described later.

As will be described in detail later, the running control unit 16 calculates a target steered angle lkat for causing the vehicle to travel along the target course in accordance with the flowchart shown in FIG. 2. Further, the running control unit 16 calculates the LKA-controlled steering torque Tds for setting a steered angle $\theta$ to the target steered angle $\theta$lkat. The EPS control unit 14 calculates a final target steering assist torque Tatf as a sum of a target steering assist torque for improving steering feeling of the driver and the steering torque Tds for the LKA control according to the flowchart shown in FIG. 5. Further, the EPS control unit 14 controls the electric power steering device 12 so that a steering assist torque Ta conforms to the final target steering assist torque Tatf.

As understood from the above explanation, the running control unit 16 and the EPS control unit 14 cooperate with each other to execute the LKA control, which is a running control, to make the vehicle run along the target course so as to support a driver in driving. In the LKA control, the driving lane is specified based on an image information in front of the vehicle taken by the CCD camera 60, and a target trajectory is set as a target course passing through the center of the driving lane. However, the target trajectory may be a line passing through a position other than the center of a driving lane, or may be a trajectory for preventing the vehicle from deviating from the driving lane. In addition, although the LKA control is performed when the selection switch 62 is ON, even if the selection switch 62 is OFF, an auto-steering (emergency avoidance steering) for emergency avoidance that enables, for example, the vehicle 18 to run bypassing an obstacle ahead of the vehicle may be performed as part of the driving support control.

In particular, as will be described in detail later, the running control unit 16 calculates a curvature R of the target trajectory and a lateral deviation Y and a yaw angle deviation $\varphi$ of the vehicle 18 with respect to the target trajectory and calculates, based on these values, a target lateral acceleration Gyt of the vehicle for running the vehicle along the target trajectory. Further, the running control unit 16 calculates a target steered angle $\theta$lkat as a steered angle for setting a lateral acceleration Gy of the vehicle to the target lateral acceleration Gyt. When a magnitude of the lateral deviation Y or the yaw angle deviation $\varphi$ exceeds a reference value, the running control unit 16 decreasingly corrects the magnitude of the lateral deviation Y or yaw angle deviation $\varphi$ for calculating the target lateral acceleration Gyt.

<Calculation of Steering Torque Tds for LKA Control>

Figure 3:
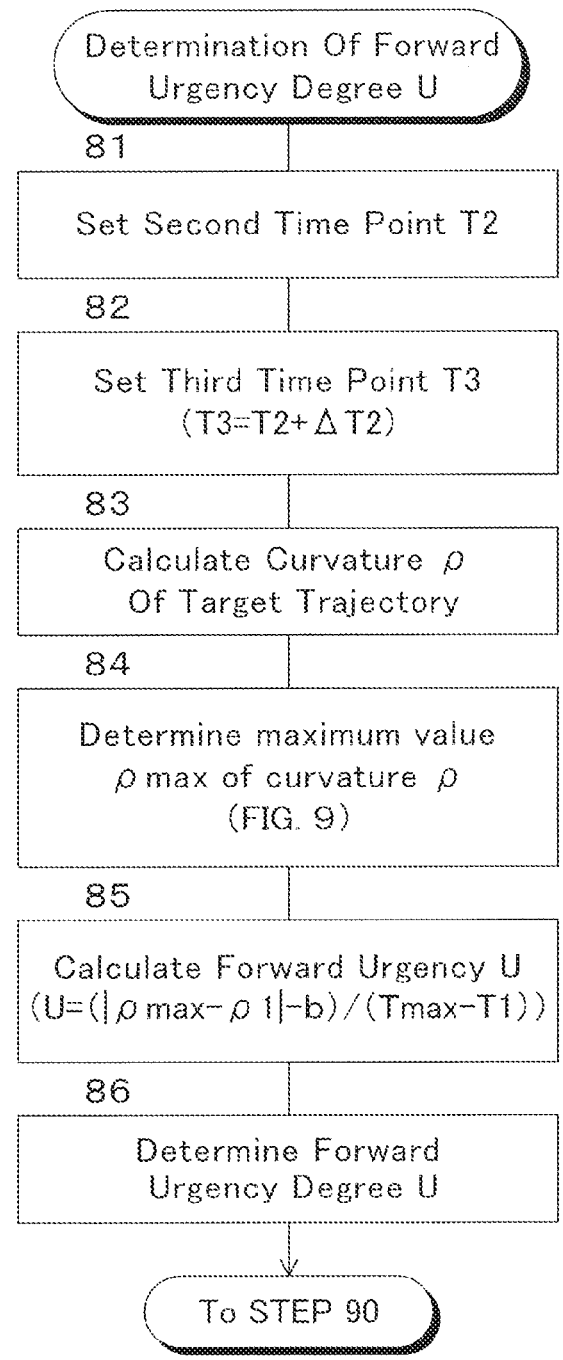
FIG. 3 is a flowchart showing a determination routine of forward urgency degree U executed in step 80 of the flowchart shown in FIG. 2.
Figure 4:
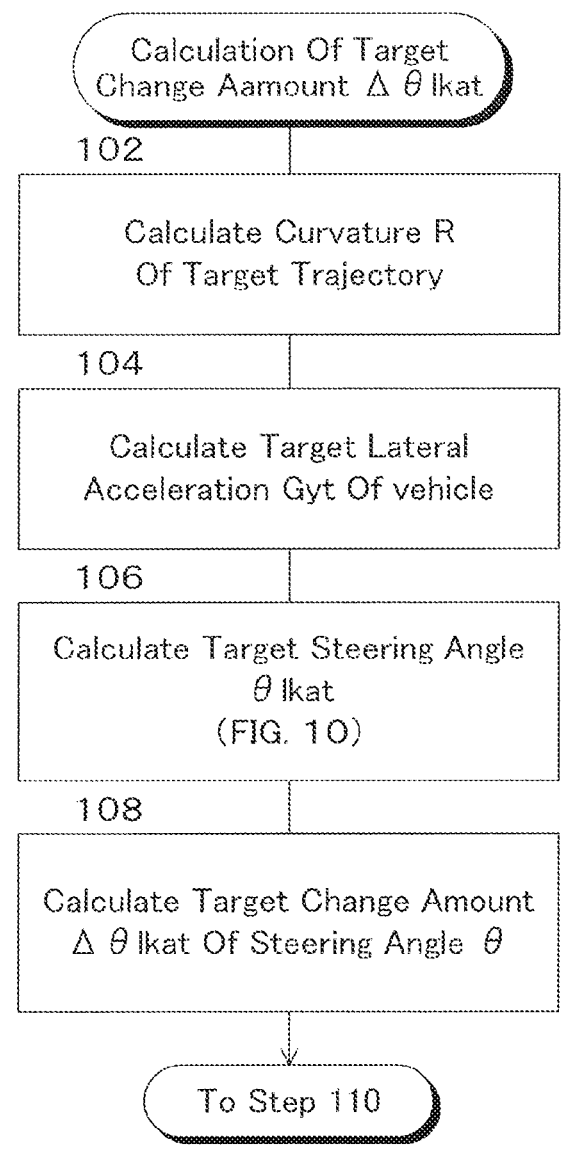
FIG. 4 is a flowchart showing a calculation routine for a target correction amount Δθlkat executed in step 100 of the flowchart shown in FIG. 2.

Next, with reference to the flow charts shown in FIGS. 2 to 4, the calculation control routine of the target steering torque Tds for the LKA control in the first embodiment will be described. The control according to the flow charts shown in FIGS. 2 to 4 is repeatedly executed at predetermined time intervals by the running control unit 16 when an ignition switch (not shown) is on. Note that the control according to the flowcharts shown in FIGS. 2 to 4 is simply referred to as "LKA control".

First, in step 10, it is determined whether or not the LKA control is being executed. When an affirmative determination is made, the LKA control proceeds to step 30, and when a negative determination is made, the steering torque Tds of the LKA control is set to 0 in step 20, after which the LKA control proceeds to step 160. It is to be noted that the LKA control is performed when the selection switch 62 is on and preset permission conditions (e.g., the EPS control unit 14 is normal) and possible conditions (for example, it is possible to specify a driving lane by recognizing a white line on a road) are satisfied.

In step 30, a target trajectory of the vehicle along a running road is determined by analyzing an image information ahead of the vehicle 18 taken by the CCD camera 60 or the like. Further, a lateral deviation Y which is a lateral deviation of the vehicle 18 with respect to the target trajectory and the yaw angle deviation $\varphi$ which is an angle formed by the longitudinal direction of the vehicle 18 with respect to the target trajectory are calculated. In the first embodiment, both a target value of a lateral position of the vehicle 18 with respect to the target trajectory and a target value of an angle formed by the longitudinal direction of the vehicle 18 with respect to the target trajectory are 0. However, at least one of them may not be 0.

The determination of a target trajectory of the vehicle 18 may be performed based on information from a navigation device not shown in the drawings or based on a combination of analysis of image information and information from a navigation device. Further, a lateral deviation Y and a yaw angle deviation $\varphi$ are parameters necessary for performing the trajectory control for causing the vehicle to travel along a target trajectory, but since the calculation procedure does not form the gist of the present disclosure, these parameters may be calculated in an arbitrary manner.

In step 40, it is determined whether or not a flag F is 1, that is, whether or not determination of a forward urgency degree U in step 80 described below is completed. When an affirmative determination is made, the LKA control proceeds to step 90, and when a negative determination is made, the LKA control proceeds to step 50.

In step 50, it is determined whether or not steering operation had been started by the driver and the steering operation has ended. When an affirmative determination is made, the flag F is set to 1 in step 60, and thereafter the LKA control proceeds to step 80. On the other hand, when a negative determination is made, the forward urgency degree U is set to the low urgency degree (UL) in step 70, and thereafter the LKA control proceeds to step 90.

In step 80, it is determined according to the flowchart shown in FIG. 3 whether the forward urgency degree U is either low urgency (UL), medium urgency (UM) or high urgency (UH). It should be noted that the forward urgency degree U is an index value indicating the necessity of quickly bringing the running state of the vehicle 18 along the target trajectory by the LKA control.

Figure 7A:
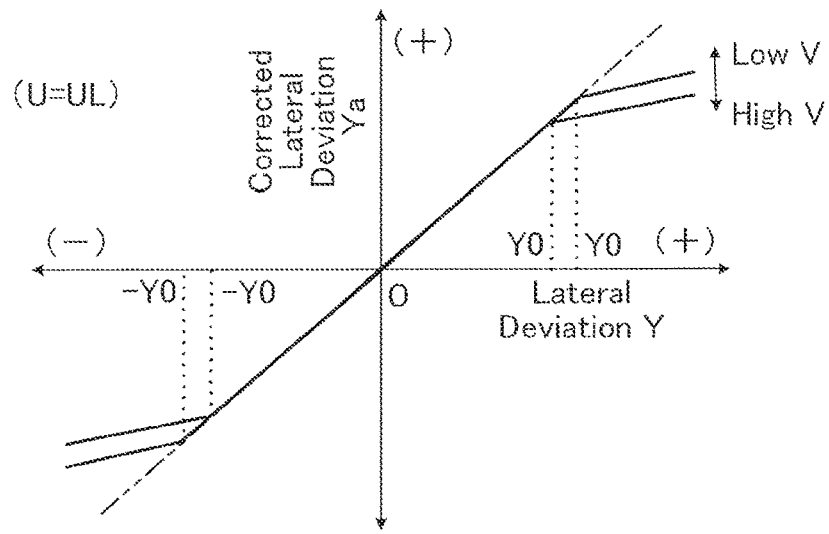
FIGS. 7A to 7C are diagrams showing maps for calculating a corrected lateral deviation Ya of the vehicle for the cases where the forward urgency degree U is the low urgency (UL), the medium urgency (UM) and the high urgency (UH), respectively.
Figure 7B:
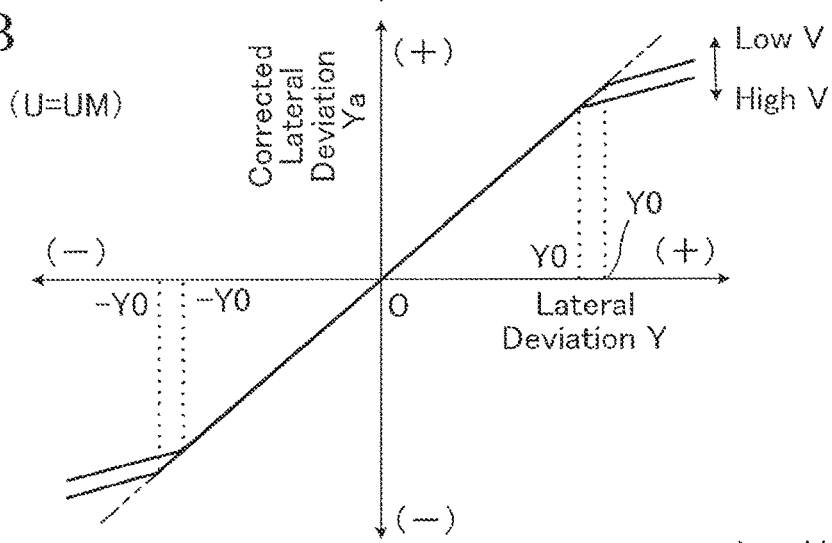
Figure 7C:
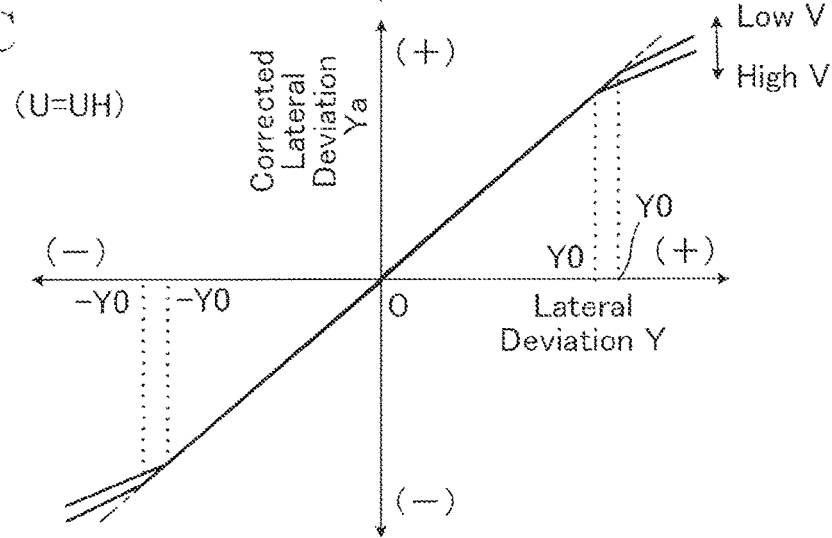
Figure 8D:
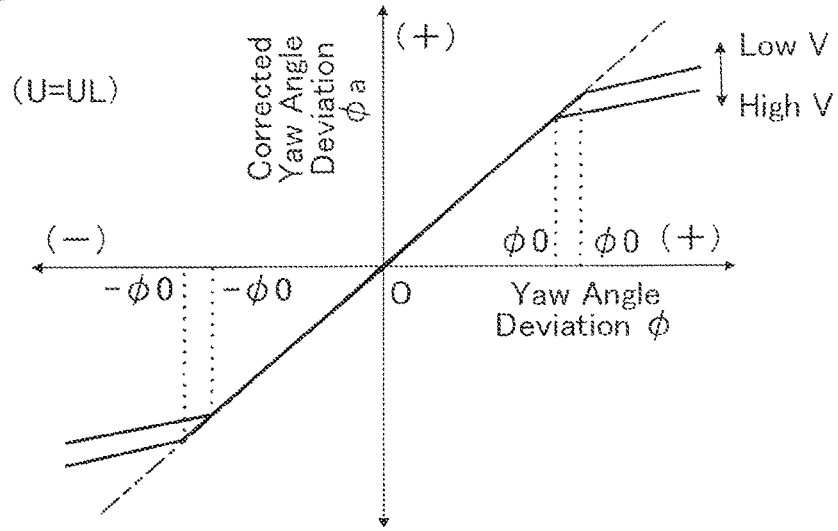
FIGS. 8D to 8F are diagrams showing maps for calculating a corrected angular deviation φa of the vehicle for the cases where the forward urgency degree U is the low urgency (UL), the medium urgency (UM) and the high urgency (UH), respectively.
Figure 8E:
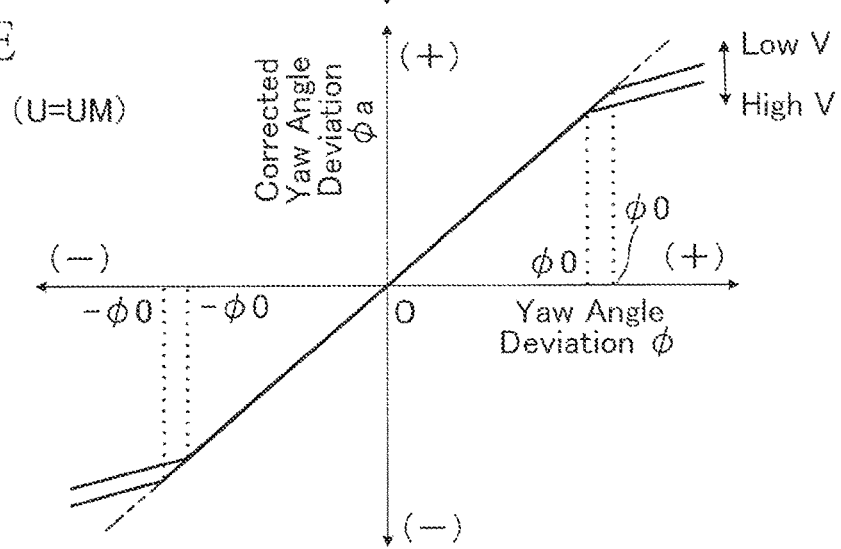
Figure 8F:
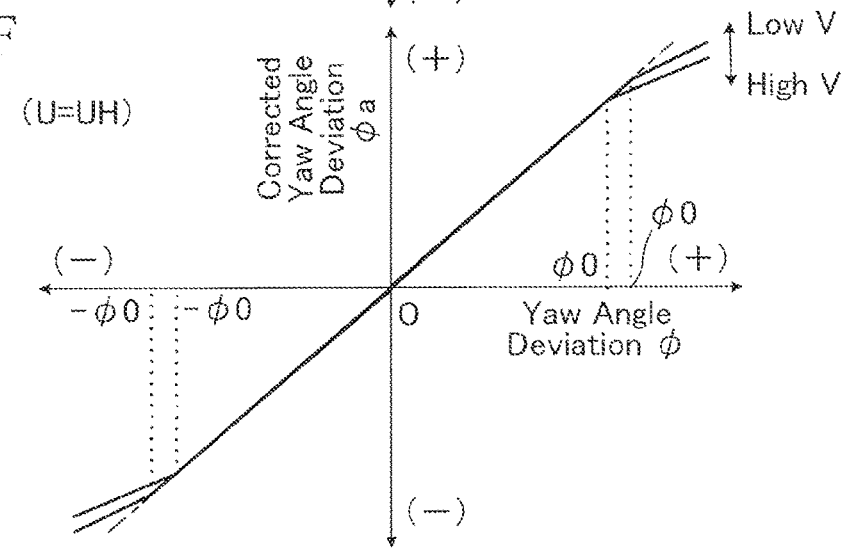

In step 90, maps for correcting the lateral deviation Y and the yaw angle deviation $\varphi$ according to the forward urgency degree U determined in step 80 are respectively selected from the maps shown in FIGS. 7A to 7C and the maps shown in FIGS. 8D to 8F. Further, by referring to the selected maps on the basis of the lateral deviation Y and the yaw angle deviation $\varphi$, a corrected lateral deviation Ya and a corrected yaw angle deviation $\varphi$a are calculated, respectively. It is to be noted that in FIGS. 7A to 7C and FIGS. 8D to 8F, the alternate long and two short dashed lines indicate that a corrected lateral deviation Ya and a corrected yaw angle deviation $\varphi$a are the same as the lateral deviation Y and the yaw angle deviation $\varphi$, respectively.

As shown in FIGS. 7A to 7C, in the range where a magnitude of the lateral deviation Y is equal to or less than a reference value Y0 (a positive value) of the lateral deviation, a corrected lateral deviation Ya is calculated to the same value as the lateral deviation Y. However, in the range where an absolute value of the lateral deviation Y exceeds the reference value Y0, a corrected lateral deviation Ya is calculated such that its absolute value is smaller than the absolute value of the lateral deviation Y. The absolute value of the reference value Y0 decreases as the vehicle speed V increases and increases as the forward urgency degree U increases. The degree to which a corrected lateral deviation Ya decreases with respect to the lateral deviation Y increases as a vehicle speed V increases, and decreases as the forward urgency degree U increases. In the range where a magnitude of the lateral deviation Y exceeds the reference value Y0, the corrected lateral deviation Ya may be a constant value.

Similarly, as shown in FIGS. 8D to 8F, in the range where a magnitude of the yaw angle deviation $\varphi$ is equal to or less than a reference value $\varphi$0 (a positive value) of the yaw angle deviation, a corrected yaw angle deviation $\varphi$a is calculated to the same value as the yaw angle deviation $\varphi$. However, in the range where an absolute value of the yaw angle deviation $\varphi$ exceeds the reference value $\varphi$0, a corrected yaw angle deviation $\varphi$a is calculated such that its absolute value is smaller than the absolute value of the yaw angle deviation $\varphi$. The absolute value of the reference value $\varphi$0 decreases as a vehicle speed V increases and increases as the forward urgency degree U increases. The degree to which a corrected yaw angle deviation φa decreases with respect to the yaw angle deviation φ increases as a vehicle speed V increases, and decreases as the forward urgency degree U increases. In the range where a magnitude of the yaw angle deviation φ exceeds the reference value φ0, the corrected yaw angle deviation φ may be a constant value.

In step 100, according to the flowchart shown in FIG. 4, the target change amount Δθlkat of the steered angle θ necessary for running the vehicle along the target trajectory is calculated based on the corrected lateral deviation Ya and the corrected yaw angle deviation φa. The target change amount Δθlkat of the steered angle θ is calculated as a value corresponding to the target change amount of the steered angle of the front wheels 20FL and 20FR which are steerable wheels.

In step 110, a target steering torque Tds for the LKA control is calculated as a torque corresponding to a driving force for changing the steered angle θ by the target change amount Δθlkat by a PID compensation calculation based on the target change amount Δθlkat.

When step 110 is completed, the LKA control proceeds to step 160, and in step 160, a signal indicating the target steering torque Tds of the LKA control is output from the LKA control unit 16 to the EPS control unit 14.

In step 170, it is determined whether or not a condition (control ending condition) to reset the flag F to 0 is satisfied. When a negative determination is made, the LKA control is once terminated, and when an affirmative determination is made, the flag F is reset to 0 in step 180 and then the LKA control is once terminated. It may be determined that the reset condition is satisfied when an absolute value of the lateral deviation Y and the absolute value of the yaw angle deviation φ become equal to or less than respective termination reference values or when a preset time has elapsed since the driver's steering operation has ended.

<Determination of Forward Urgency Degree U>

Next, referring to the flowchart shown in FIG. 3, a determination routine of the forward urgency degree U executed in step 80 will be described.

First, in step 81, a second time point T2 is set by estimating a first time ΔT1 based on the lateral deviation Y and the yaw angle deviation φ calculated in the above-described step 40. The first time ΔT1 is a period of time between the present (first time point T1) and a time point at which an absolute value of the lateral deviation Y and an absolute value of the yaw angle deviation φ are decreased to values equal to or less than the respective termination reference values by the LKA control in which the lateral deviation Y and the yaw angle deviation φ are corrected (see FIG. 18).

In step 82, a third time point T3 (=T2+ΔT2) is set as a time elapse of the second time ΔT2 (a positive constant) from the second time point T2. Incidentally, the second time ΔT2 may be variably set, for example, such that it increases as a vehicle speed V increases.

In step 83, a curvature ρ of the target trajectory is calculated for each target trajectory estimated for the vehicle 18 to pass in the range from the second time point T2 to the third time point T3 at predetermined time intervals.

Figure 9:
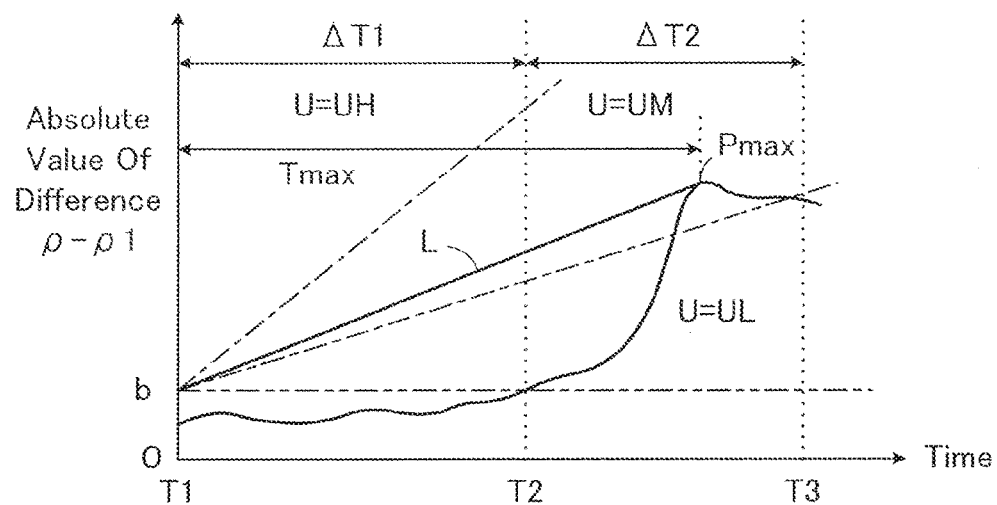
FIG. 9 is a diagram for explaining the procedure of calculating a curvature ρ of a target trajectory and the manner of determining a maximum value ρ max of a curvature of the target trajectory.

In step 84, as shown in FIG. 9, the largest absolute value among the curvatures ρ of the target trajectory calculated in step 73 is determined as the maximum value βmax of the curvature of the target trajectory. FIG. 9 is a graph showing an example of a change in absolute value of a difference (ρ−ρ1) with the lapse of time, in which the horizontal axis represents time and the vertical axis represents an absolute value of the difference (ρ−ρ1) between the curvature ρ of the target trajectory at each predetermined time and the curvature ρ1 of the target trajectory at the first time point T1.

In step 85, the forward urgency degree U is calculated according to the following equation (1). In the following equation (1), b is a positive constant, and T max is the time from the first time point T1 to the point of time when the curvature ρ of the target trajectory reaches the maximum value ρ max. As shown in FIG. 9, the forward urgency is an inclination of the straight line L connecting the coordinate point (T1 b) and the point P max of the absolute value of the difference ρ max−ρ1.

$$U=(|\rho \max-\rho 1|-b)/(T\max-T1) \quad (1)$$

In step 86, it is determined whether the forward urgency degree U is either low urgency (UL), medium urgency (UM) or high urgency (UH). Specifically, when the forward urgency degree U is equal to or less than a reference value U1 (a positive constant), it is determined to be low urgency (UL), when the forward urgency degree U is larger than the reference value U1 and is equal to or less than a reference value U2 (a positive constant larger than the reference value U1), it is determined to be the medium urgency (UM), and when the forward urgency degree U is larger than the reference value U2, it is determined to be the high urgency (UH).

<Calculation of Target Change Amount Δθlkat>

Next, with reference to the flowchart shown in FIG. 4, a calculation routine of the target change amount Δθlkat executed in step 100 will be described.

First, in step 102, a curvature R (a reciprocal of a radius) of the target trajectory is calculated in a manner known in the art.

In step 104, on the basis of the curvature R, the corrected lateral deviation Ya calculated in step 90, and the corrected yaw angle deviation φa, a target lateral acceleration Gyt is calculated as a state quantity of the vehicle 18 necessary for running the vehicle along the target trajectory. The target lateral acceleration Gyt may be calculated by a function of the curvature R, the corrected lateral deviation Ya and the corrected yaw angle deviation φa. Alternatively, a map may be set which shows relationship among the curvature R, the corrected lateral deviation Ya, and the corrected yaw angle deviation φa and the target lateral acceleration Gyt, and the target lateral acceleration Gyt may be calculated from the map.

Figure 10:
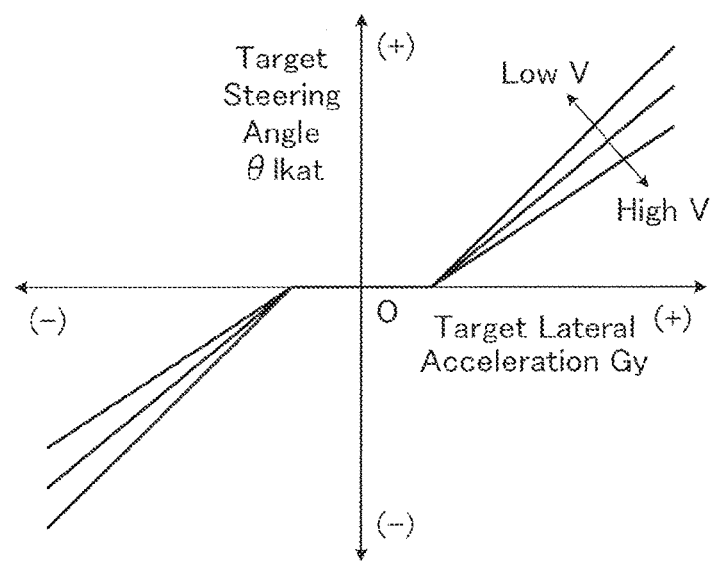
FIG. 10 is a diagram showing a map for calculating a target steered angle θlkat for LKA control based on a target lateral acceleration Gyt of the vehicle and a vehicle speed V.

In step 106, a target steered angle θlkat for trajectory control is calculated by referring to the map shown in FIG. 10 on the basis of the target lateral acceleration Gyt and a vehicle speed V of the vehicle. As shown in FIG. 10, a target steered angle θlkat is calculated such that the larger the absolute value of the target lateral acceleration Gyt is, the larger the magnitude of the target steered angle is, and the higher a vehicle speed is, the smaller the target steered angle is.

In step 108, a target change amount Δθlkat, which is the correction amount of a steered angle θ required to make the vehicle 18 travel along the target trajectory, is calculated as a difference (θlkat−θ) between the target steered angle θlkat and the steered angle θ.

<Steering Assist Torque Control>

Figure 5:
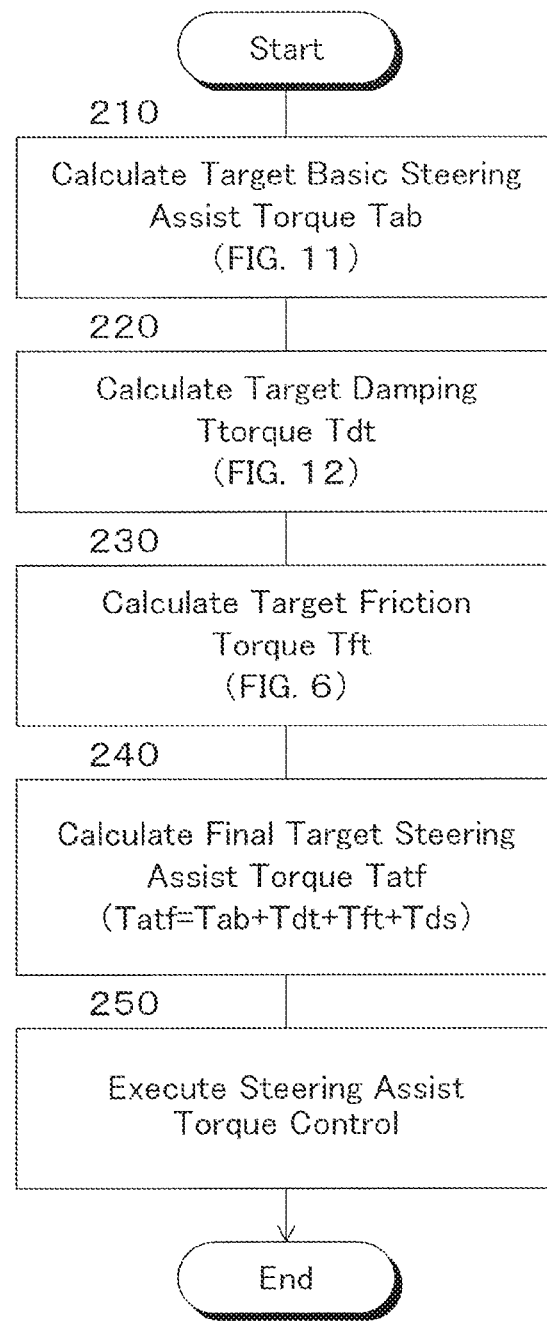
FIG. 5 is a flowchart showing a steering assist torque control routine in the first embodiment.

Next, the steering assist torque control routine in the first embodiment will be described with reference to the flowchart shown in FIG. 5. The control according to the flowchart shown in FIG. 5 is repeatedly executed at predetermined time intervals by the EPS control unit 14 when the ignition switch (not shown) is on.

Figure 11:
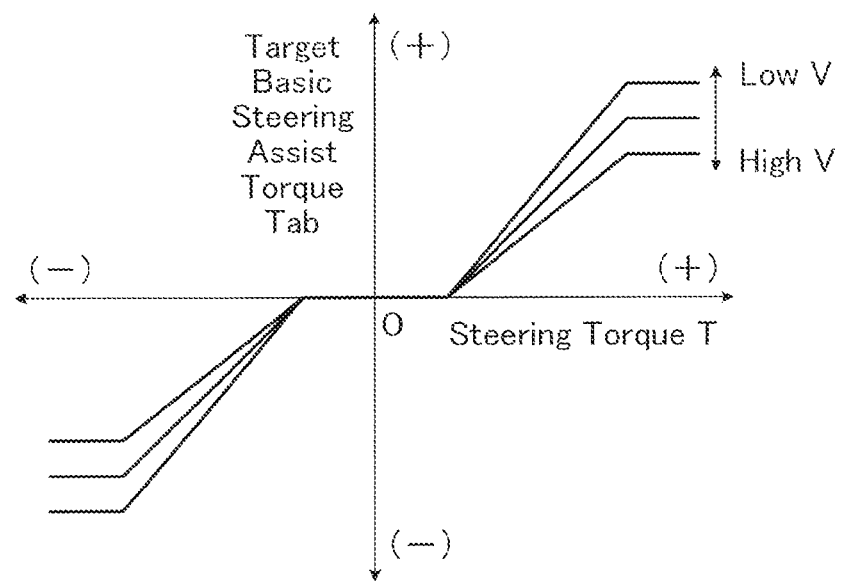
FIG. 11 is a diagram showing a map for calculating the target basic steering assist torque Tab based on the steering torque T and the vehicle speed V.

First, in step 210, the map shown in FIG. 11 is referred to based on a steering torque T and a vehicle speed V to calculate a target basic steering assist torque Tab for reducing the driver's steering burden. As shown in FIG. 11, the target basic steering assist torque Tab is calculated such that the absolute value increases as the absolute value of the steering torque T increases and the absolute value increases as the vehicle speed V decreases.

Figure 12:
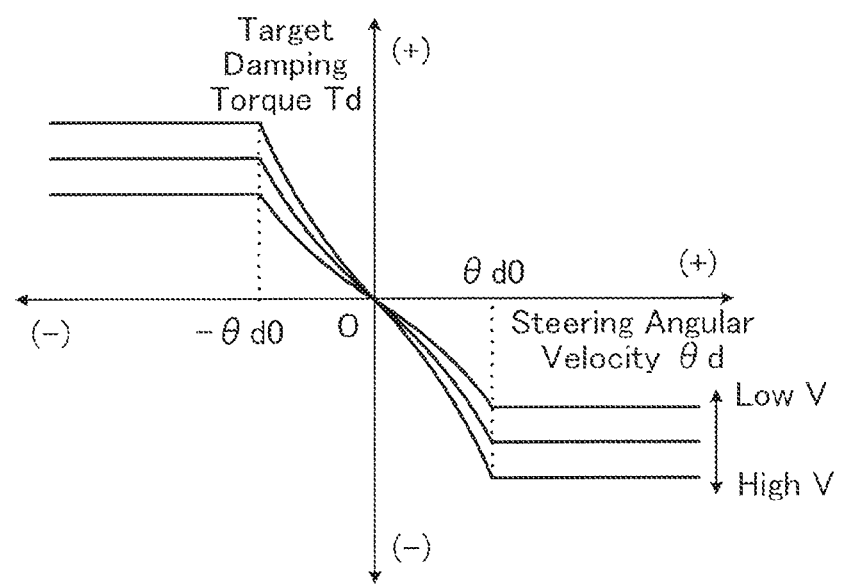
FIG. 12 is a diagram showing a map for calculating a target damping torque Tdt based on a steering angular velocity θd and a vehicle velocity V.

In step 220, for example, a steering angular velocity θd is calculated as a time differentiated value of a steered angle θ, and based on the steering angular velocity θd and a vehicle velocity V, the map shown in FIG. 12 is referred to, whereby a target damping torque Tdt which is the component of the steering assist torque damping control is calculated. The target damping torque Tdt is calculated so that an absolute value of the target damping torque Tdt increases as a vehicle speed V increases, the absolute value increases as the absolute value of the steering angular velocity θd increases when the magnitude of the steering angular velocity θd is less than the reference value θd0 (a positive value), and the target damping torque is a constant value when the absolute value of the steering angular velocity θd is equal to or larger than the reference value θd0.

Figure 6:
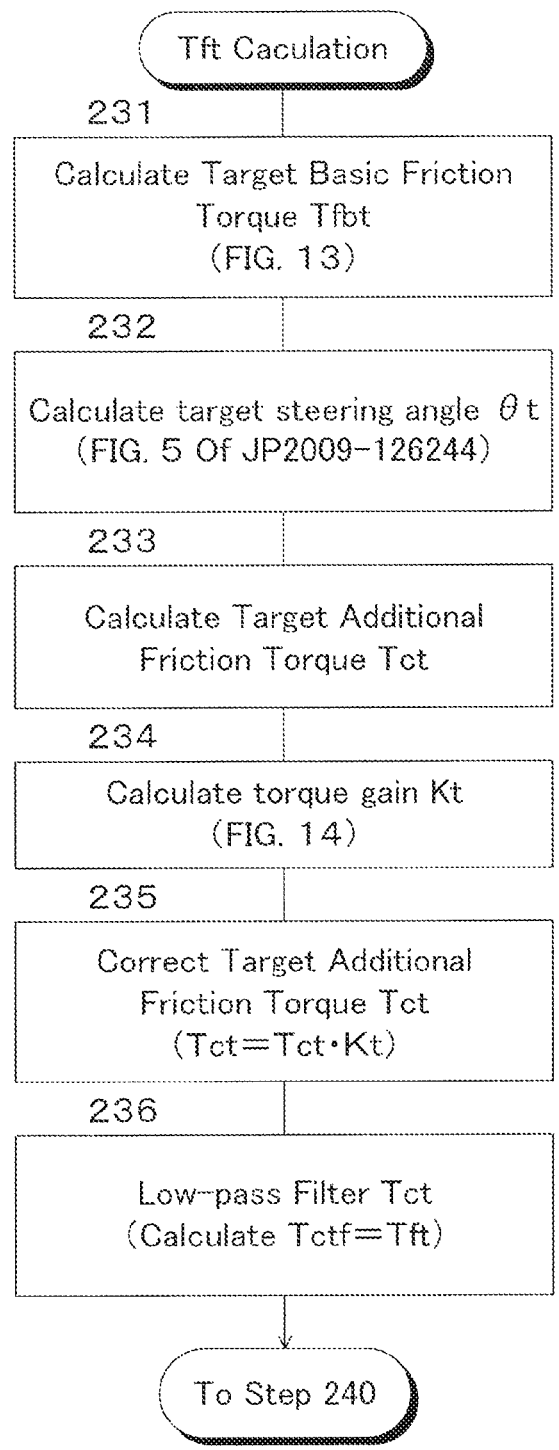
FIG. 6 is a flowchart showing a calculation routine of a target friction torque Tdt executed in step 230 of the flowchart shown in FIG. 5.

In step 230, a target friction torque Tft which is the friction control component of the steering assist torque is calculated according to the flowchart shown in FIG. 6. The target damping torque Tdt is a torque for reducing the wobble of the steering wheel 22 and the target friction torque Tft is a torque for giving a moderate resistance to the steering, each of which acts as a drag torque against steering operation.

In step 240, a final target steering assist torque Tatf is calculated as a sum (Tab+Tdt+Tft+Tds) of the target basic steering assist torque Tab, the target damping torque Tdt, the target friction torque Tft, and the target steering torque Tds of the LKA control. The sum of the target basic steering assist torque Tab, the target damping torque Tdt and the target friction torque Tft is a target steering assist torque Tat for reducing the driver's steering burden and improving the driver's steering feeling. Therefore, the final target steering assist torque Tatf is calculated as the sum of the target steering assist torque Tat and the target steering torque Tds for the LKA control. The target steering assist torque Tat is not limited to the sum of the torques and may be calculated as a sum of arbitrary torques known in the art.

In step 250, the power steering device 12 is controlled based on the final target steering assist torque Tatf so that the steering assist torque Ta of the power steering device 12 conforms to the final target steering assist torque Tatf. Consequently, the steering assist torque conforms to the target steering assist torque Tat and the steering torque of the LKA control is controlled to be the target steering torque Tds. Therefore, by controlling a change amount of the steered angle θ to the target change amount Δθlkat, the steered angle of the front wheels 20FL and 20FR serving as the steerable wheels is changed by the target change amount corresponding to the target change amount Δθlkat.

<Calculation of Target Friction Torque Tft>

Next, with reference to the flowchart shown in FIG. 6, the calculation routine of the target friction torque Tft executed in step 230 will be described.

Figure 13:
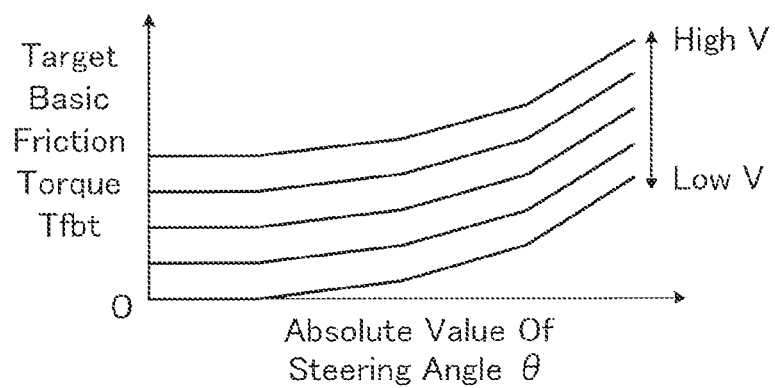
FIG. 13 is a diagram showing a map for calculating the target basic friction torque Tftb based on an absolute value of a steered angle θ and a vehicle speed V.

First, in step 231, based on an absolute value of the steered angle θ and a vehicle speed V, a target basic friction torque Tfbt is calculated from the map shown in FIG. 13. As shown in FIG. 13, the target friction torque Tft is calculated such that it increases as the absolute value of the steered angle θ increases, and increases as the vehicle speed V increases.

Although not shown in the drawings, when a vehicle speed V is in a middle to a high vehicle speed range, a self aligning torque Tsat increases as an absolute value of the steered angle θ increases. Therefore, in order to reduce the required steering force in the range where a magnitude of the steered angle θ is large and to improve the convergence of the steering, the target friction torque Tft is calculated to have a larger value as an absolute value of the steered angle θ is larger. Further, the self-aligning torque Tsat increases as a vehicle speed V increases. Therefore, the target friction torque Tft is calculated to a larger value as a vehicle speed V is higher so as to reduce a necessary steering force at medium to high speed traveling as a vehicle speed V is higher to enhance the convergence of the steering and to reduce the steering resistance during low speed traveling.

In step 232, a target steered angle θt for controlling the friction torque is calculated. Incidentally, the target steered angle θt may be calculated in the same manner as the calculation of the target steered angle θt performed according to the flowchart shown in FIG. 5 of Japanese Patent Application Laid-open No. 2009-126244, for example.

In step 233, a target additional friction torque Tct is calculated based on the steered angle θ and the target steered angle θt according to the following formula (2). The gain K in the following equation (2) is a positive value. As understood from the following equation (2), the sign of the target additional friction torque Tct, that is, its action direction is determined by the magnitude relation of the steered angle θ and the target steered angle θt.

$$Tct = K(\theta t - \theta) \quad (2)$$

Figure 14:
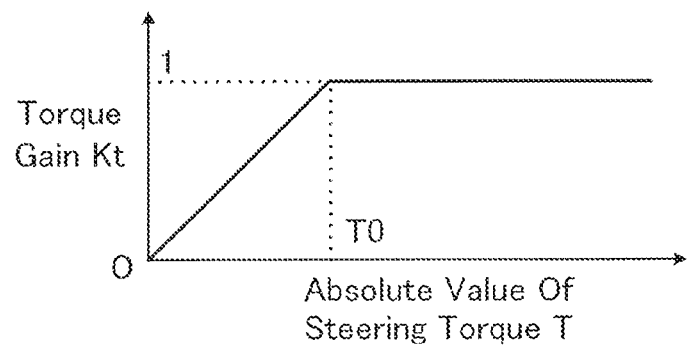
FIG. 14 is a diagram showing a map for calculating the torque gain Kt based on an absolute value of a steering torque T.

In step 234, a torque gain Kt is calculated from the map shown in FIG. 14 based on an absolute value of the steering torque T. When the absolute value of the steering torque T is less than a reference value T0 (a positive value), the larger the absolute value of the steering torque T is, the larger the torque gain Kt becomes in the range from 0 to 1 but less than 1, and when the absolute value of the steering torque T When the value is equal to or larger than the reference value T0, the torque gain is 1.

In step 235, the target additional friction torque Tct is corrected by multiplying the target additional friction torque Tct by the torque gain Kt.

In step 236, the corrected target additional friction torque Tct is low-pass filtered so that the target friction torque Tft is calculated as the target additional friction torque Tctf after the low-pass filtering in which the high frequency noise component has been removed.

Operation of First Embodiment

The operation of the driving support apparatus 10 according to the first embodiment configured as described above will be described with respect to various cases.

<When LKA Control is not Executed>

Figure 2:
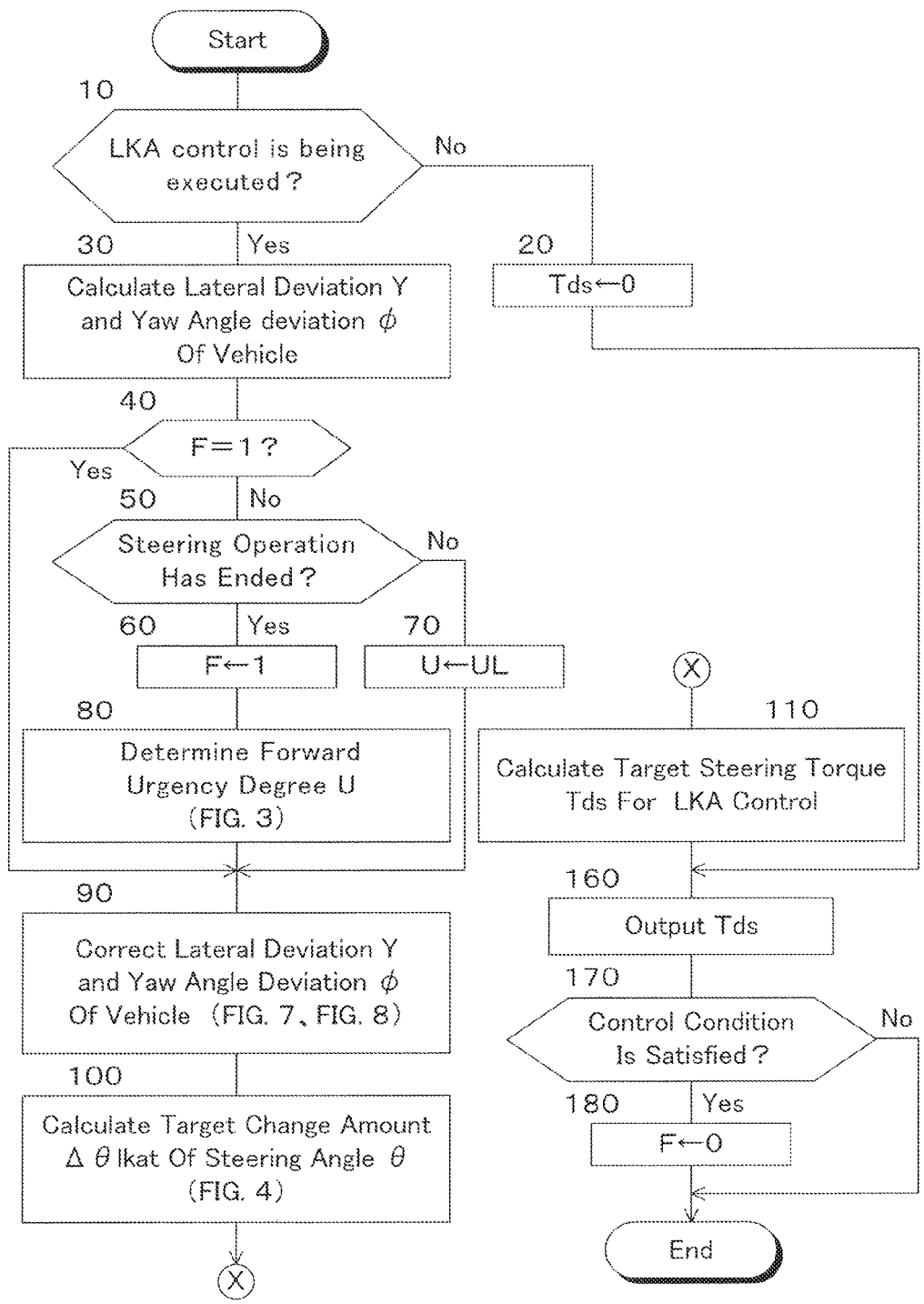
FIG. 2 is a flowchart showing an arithmetic control routine of a target steering torque Tds for LKA control in the first embodiment.

If the LKA control is not being executed, a negative determination is made in step 10 of the flowchart shown in FIG. 2, and the target steering torque Tds for the LKA control is set to 0 in step 20. In step 240 of the flowchart shown in FIG. 5, the final target steering assist torque Tatf is calculated to be the same value as only the target steering assist torque Tat, so that the control of the steered angle of the front wheels 20FL and 20FR by the LKA control is not executed.

<During LKA Control>

If the LKA control is being executed, an affirmative determination is made in step 10 of the flowchart shown in FIG. 2, and in steps 30 to 110, the target steering torque Tds of the LKA control for running the vehicle along the target trajectory is calculated. In step 240 of the flowchart shown in FIG. 5, the final target steering assist torque Tatf is calculated as the sum of the target steering assist torque Tat and the target steering torque Tds, so that the steered angle of the front wheels 20FL and 20FR is controlled by the LKA control.

<Before Start of Steering or During Steering>

In the case where a steering operation is not started by a driver and in the case where a steering operation is being performed by the driver, that is, in the situation before the second time point T2, in steps 40 and 50 of the flowchart shown in FIG. 2, negative determinations are made. Therefore, since in step 70, the forward urgency degree U is set to the low urgency degree (UL), in step 90, the lateral deviation Y and the yaw angle deviation $\varphi$ are corrected according to the maps shown in FIGS. 7A and 8D, respectively.

<After End of Steering>

When steering by the driver is ended, a negative determination is made in step 40, but an affirmative determination is made in step 50 and after the flag F is set to 1 in step 60, the forward urgency degree U is determined in step 80. Thereafter, since the flag F is maintained at 1 until an affirmative determination is made in step 170, an affirmative determination is made in step 40, and in step 90, the lateral deviation Y and the yaw angle deviation $\varphi$ are corrected according to the maps shown in FIGS. 7A to 7C and FIGS. 8D to 8F, respectively, based on the forward urgency degree U.

Figure 15:
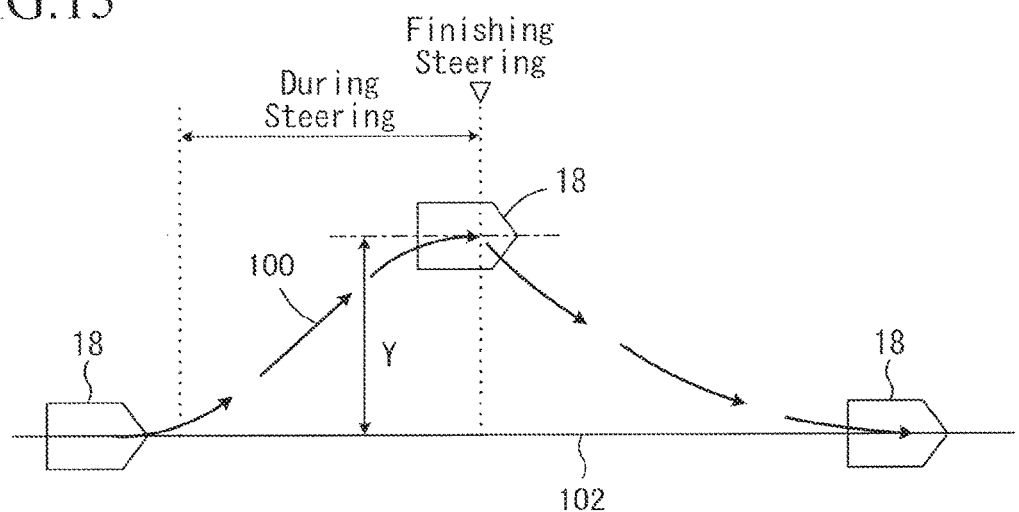
FIG. 15 is an explanatory diagram showing the control of the lateral deviation Y of the vehicle according to the first embodiment in comparison with the conventional case.
Figure 16:
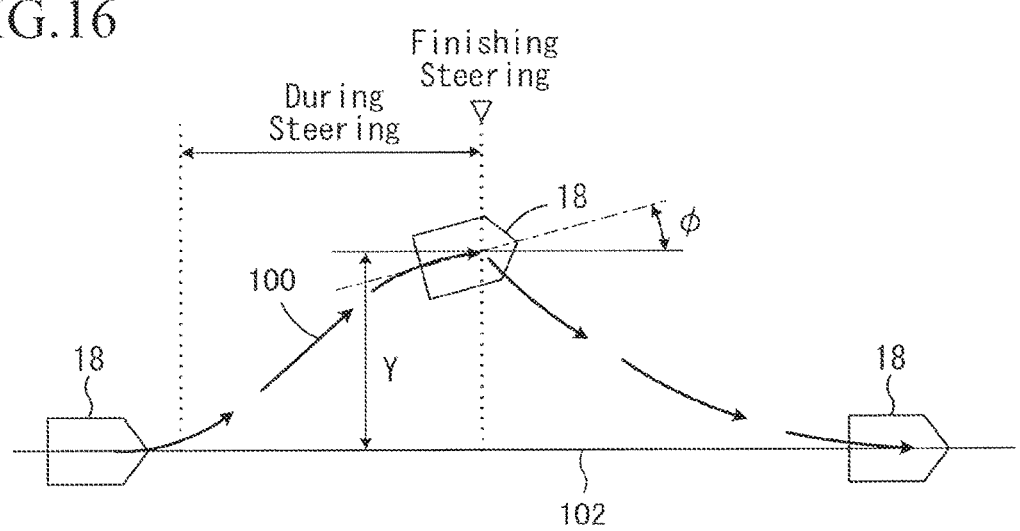
FIG. 16 is an explanatory diagram showing the control of a yaw angle deviation φ of the vehicle according to the first embodiment in comparison with a conventional case.

As shown in FIGS. 15 and 16, steering may be performed by the driver during execution of the LKA control, and a traveling route 100 of the vehicle 18 may deviate from the target trajectory 102, resulting in that a magnitude of the lateral deviation Y and/or a magnitude of the yaw angle deviation $\varphi$ may increase. As a magnitude of the lateral deviation Y and/or a magnitude of the yaw angle deviation $\varphi$ increases, a magnitude of the target change amount $\Delta\theta$lkat of the steered angle $\theta$ increases and a magnitude of the target steering torque Tds for LKA control also increases. When the driver intends to drive the vehicle along a traveling route different from the target trajectory, he or she steers against the turning torque corresponding to the target steering torque Tds.

As shown in FIG. 15, when the lateral deviation Y increases in magnitude by steering by the driver during the execution of the LKA control, a magnitude of the target steering torque Tds for the LKA control increases correspondingly. As a result, the front wheels 20FL and 20FR are steered by the steering torque corresponding to the target steering torque Tds so that the traveling route 100 of the vehicle 18 gradually coincides with the target trajectory 102.

Similarly, as shown in FIG. 16, when a magnitude of the lateral deviation Y and a magnitude of the yaw angle deviation $\varphi$ increase due to steering by the driver during the execution of the LKA control, a magnitude of the target steering torque Tds for the LKA control correspondingly increases. As a result, the front wheels 20FL and 20FR are steered by the steering torque corresponding to the target steering torque Tds so that the traveling route 100 of the vehicle 18 gradually coincides with the target trajectory 102 and a magnitude of the yaw angle deviation $\varphi$ gradually decreases.

Figure 18:
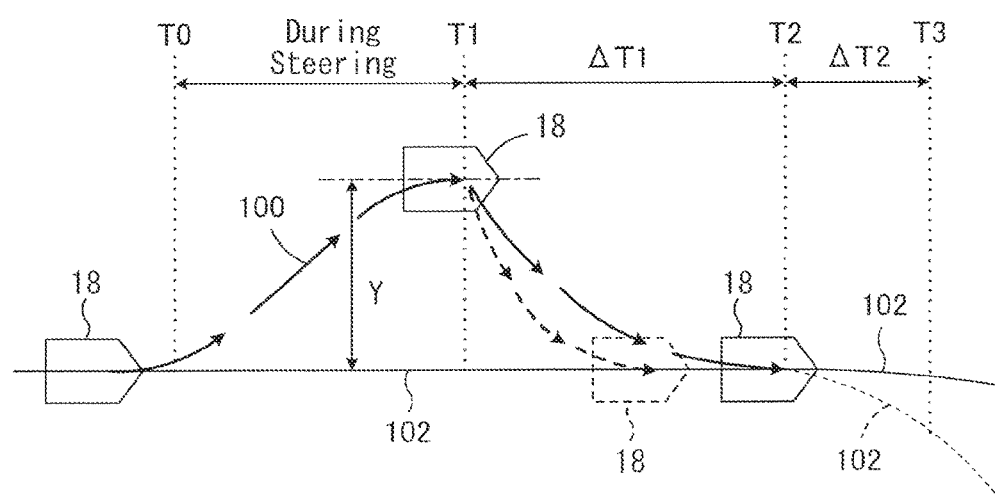
FIG. 18 is an explanatory diagram showing that a change in lateral deviation Y of the vehicle according to the first embodiment is different depending on the forward urgency degree U.

The target steering torque Tds for the LKA control differs depending on a state of the steering by the driver and the forward urgency degree U. The case where the vehicle 18 travels as shown in FIG. 18 will be described as an example. In FIG. 18, it is assumed that steering of the driver is started at time T0, the steering of the driver is finished at the first time point T1, and the absolute values of the lateral deviation Y and the yaw angle deviation $\varphi$ become equal to or less than the associated termination reference values by the second time point T2.

When the steering by the driver ends at the first time point T1 under a situation where a magnitude of the lateral deviation Y is large, a magnitude of the target change amount $\Delta\theta$lkat is large, whereas a steering torque T by the driver's steering conforms to 0. The magnitude of the lateral deviation Y decreases and the front wheels 20FL and 20FR are steered by the steering torque corresponding to the large target steering torque Tds so that the traveling route 100 of the vehicle 18 coincides with the target trajectory 102. As a result, as shown by the alternate long and two short dashes line in FIG. 18, since the vehicle 18 is moved in the lateral direction toward the target trajectory 102 at a relatively high speed, the occupant(s) of the vehicle may feel discomfort. The same also applies to when a magnitude of the yaw angle deviation $\varphi$ is large.

On the other hand, according to the first embodiment, the lateral deviation Y and the yaw angle deviation $\varphi$ are corrected in step 90 of the flowchart shown in FIG. 5. That is, when a magnitude of the lateral deviation Y exceeds the reference value Y0, the corrected lateral deviation Ya whose magnitude has been reduced is calculated using the map shown in FIGS. 7A to 7C. Similarly, when a magnitude of the yaw angle deviation $\varphi$ exceeds the reference value $\varphi$0, the corrected yaw angle deviation $\varphi$a whose magnitude has been reduced is calculated using the map shown in FIGS. 8D to 8F. In step 100, a target change amount $\Delta\theta$lkat of the steered angle $\theta$ is calculated based on the corrected lateral deviation Ya and the corrected yaw angle deviation $\varphi$a.

Therefore, as compared to where the lateral deviation Y and the yaw angle deviation $\varphi$ are not corrected, a magnitude of the target change amount $\Delta\theta$lkat decreases in the situation where a magnitude of the lateral deviation Y and/or the magnitude of the yaw angle deviation $\varphi$ is large. As a result, a magnitude of the target steering torque Tds also decreases. Accordingly, since the front wheels 20FL and 20FR are gently steered, a magnitude of the time change rate of the steered angle can be reduced. As a result, as shown by the solid arrows in FIG. 18, the moving speed of the vehicle 18 in the lateral direction after the driver's steering is ended is reduced and the possibility that the occupant(s) of the vehicle may feel uncomfortable can be reduced.

In addition, since the decrease correction amounts of the magnitudes of the lateral deviation Y and the yaw angle deviation $\varphi$ are larger t of the lateral deviation Y and the yaw angle deviation $\varphi$ are larger, the decrease amount of reduction of the magnitude of the target change amount $\Delta\theta$lkat can be increased as the magnitudes of the lateral deviation Y and the yaw angle deviation $\varphi$ increase. Therefore, while preventing the amount of change in the steered angle of the front wheels 20FL and 20FR from becoming unnecessarily small in a situation where the magnitudes of the lateral deviation Y and the yaw angle deviation $\varphi$ are small, it is possible to effectively moderate the change of the steered angle of the front wheels in a situation where the magnitudes of the lateral deviation Y and the yaw angle deviation $\varphi$ are large.

According to the first embodiment, the forward urgency degree U is determined in step 80, and in step 90, the maps for correcting the lateral deviation Y and the yaw angle deviation φ according to the forward urgency degree U are selected from the maps shown in FIGS. 7A to 7C and the maps shown in FIGS. 8D to 8F. As shown in FIGS. 7A to 7C and FIGS. 8D to 8F, the magnitude reduction degree by the correction of the lateral deviation Y and the yaw angle deviation φ is smaller as the forward urgency degree U is higher.

In a case where a magnitude of the curvature ρ of the target trajectory 104 at a position where the vehicle is estimated to exist at the third time point is small and the forward urge degree U is the low urgency degree (UL), the lateral deviation Y and the yaw angle deviation φ are corrected by using the maps shown in FIGS. 8D to 8F having a large magnitude reduction degree. Therefore, as shown by the target trajectory 102 indicated by the solid line in FIG. 18, it is possible to effectively reduce a moving speed of the vehicle 18 in the lateral direction and to effectively reduce the possibility that the occupant(s) of the vehicle may feel uncomfortable.

On the other hand, if a magnitude of the curvature ρ of the target trajectory 102 at a position where the vehicle 18 is estimated to exist at the third time point T3 is large and the forward urgency degree U is the high urgency (UH), the deviation Y and the yaw angle deviation φ are corrected using the maps shown in FIGS. 7C and 8F having a small magnitude reduction degree. As a result, a magnitude of the target change amount Δθlkat and a magnitude of the target steering torque Tds increase as compared to where the forward urgency degree U is low urgency (UL). Therefore, as shown by the broken-line trajectory 102 in FIG. 18, while reducing the possibility that the occupant(s) of the vehicle may feel uncomfortable, the vehicle 18 can efficiently be moved in the lateral direction to move the vehicle's traveling route 100 to coincide with the target trajectory 102 earlier. Therefore, even when the curvature ρ of the target trajectory 102 after the second time point T2 is large, it is possible to effectively control the vehicle 18 to travel along the target trajectory 102.

When the forward urgency degree U is the medium urgency (MH), the degree of reduction of the magnitudes of the lateral deviation Y and the yaw angle deviation φ is intermediate between the degree when the forward urgency degree U is the low urgency (UL) and the degree when the forward urgency degree U is high urgency (UH). Therefore, the travel route 100 of the vehicle is intermediate between the route indicated by the solid line arrow in FIG. 18 and the route indicated by the broken line arrow in FIG. 18.

In particular, according to the first embodiment, as shown in FIGS. 7A to 7C and FIGS. 8D to 8F, the magnitude reduction degree by the correction of the lateral deviation Y and the yaw angle deviation φ is larger as a vehicle speed V is higher. Therefore, in a low vehicle speed range where the possibility of deterioration of the stability of the vehicle 18 is low even if the running state of the vehicle is changed by the control of the steered angle of the front wheels by the LKA control, the vehicle can effectively be controlled to travel along the target trajectory. Conversely, in a high vehicle speed range, by effectively reducing a magnitude of the target change amount Δθlkat and the magnitude of the target steering torque Tds, the change in the running state of the vehicle by the LKA control can be made moderate, and it is possible to effectively reduce the possibility that the stability of the vehicle deteriorates due to the LKA control.

Figure 17:
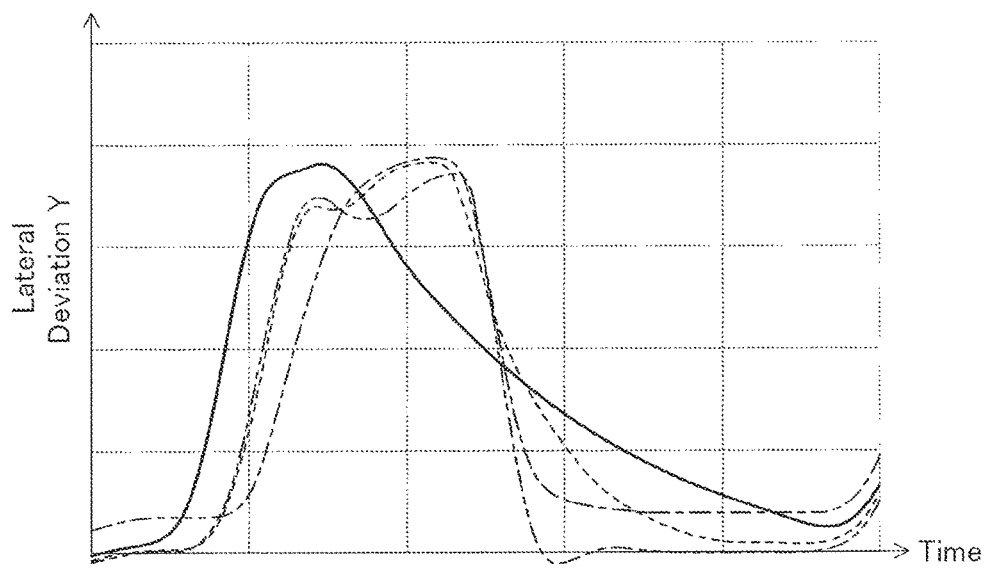
FIG. 17 is a graph showing an example of a change in a lateral deviation Y of the vehicle in the first embodiment in comparison with various comparative examples.

Further, FIG. 17 is a graph showing an example of a change in lateral deviation Y of the vehicle in the first embodiment in comparison with various comparative examples. In FIG. 17, the solid line shows a case where the reduction degree in magnitude of the lateral deviation Y and the yaw angle deviation φ is large in the first embodiment, and the broken line shows a case where the reduction degree in magnitude of the lateral deviation Y and the yaw angle deviation φ is small. The alternate long and short dash line and the two-dot chain line show a case of the comparative example in which magnitudes of the lateral deviation Y and the yaw angle deviation φ are not reduced but a magnitude of the friction torque acting as a drag torque against the steering of the front wheels is increased. Particularly, the alternate long and short dash line and the two-dot chain line indicate cases where the magnitude of the friction torque is large and small, respectively.

When the magnitude of the friction torque is large, the magnitude of the lateral deviation Y tends to remain without sufficiently decreasing, and when the magnitude of the friction torque is small, the change in magnitude of the lateral deviation Y becomes abrupt and overshoot tends to occur easily. On the other hand, according to the first embodiment, it is possible to reduce the possibility of occurrence of problems easily occurring in the comparative example. In other words, as compared to where the magnitude of the torque acting as a drag torque against the steering of the front wheels is increased, the followability of the vehicle to the target trajectory can be increased.

Second Embodiment

Figure 19:
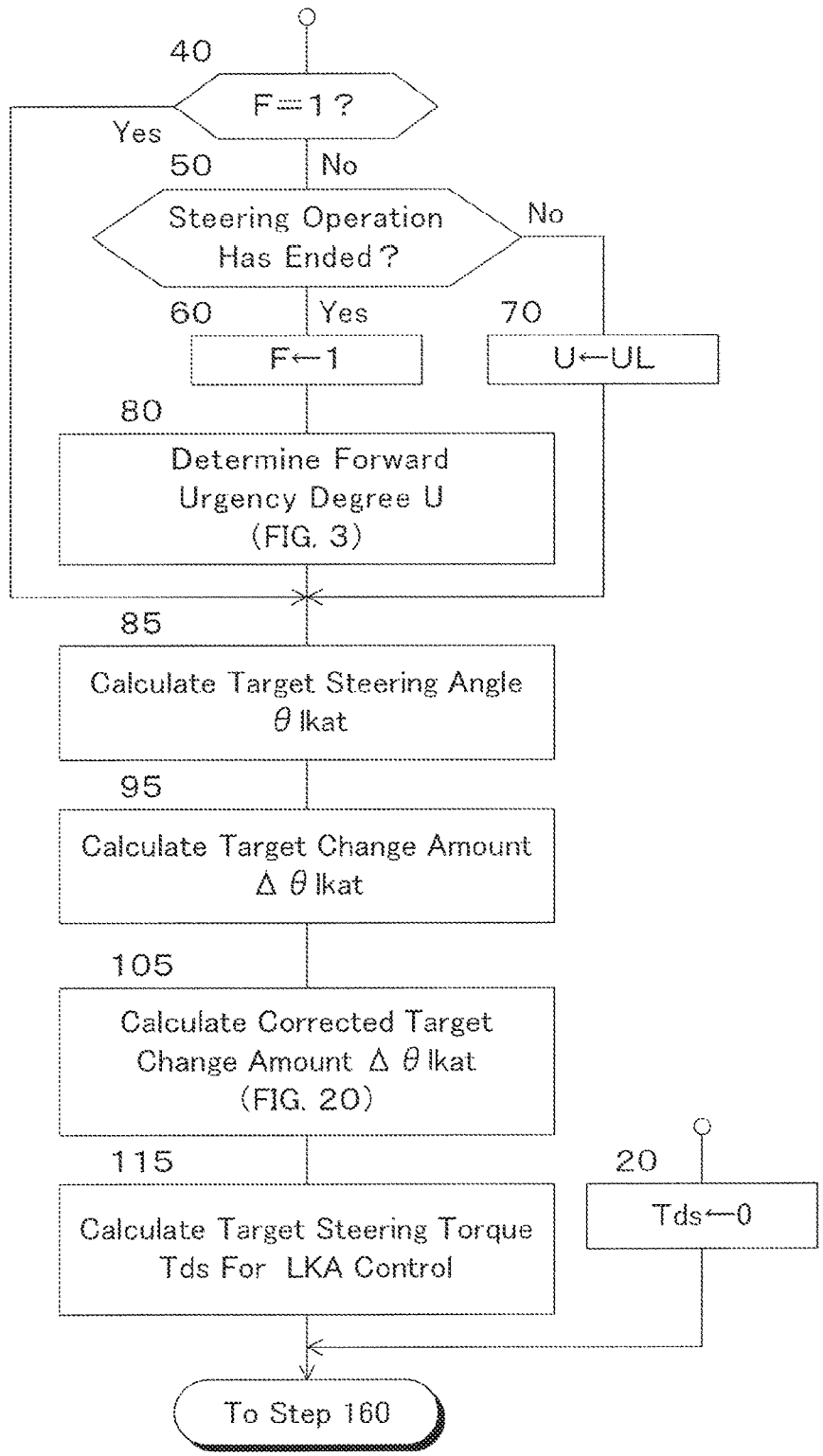
FIG. 19 is a flowchart showing a main part of an arithmetic control routine of a target steering torque Tds for LKA control in the second embodiment.

FIG. 19 is a flow chart showing the main part of the calculation control routine of the steering torque Tds of the LKA control in the second embodiment. In FIG. 19, the same step numbers as those shown in FIG. 2 are assigned to the same steps as those shown in FIG. 2. This also applies to the later-described third embodiment and the first to third modified examples.

As can be seen from a comparison between FIG. 19 and FIG. 2, in the second embodiment, steps 10 to 80 are executed in the same manner as in the first embodiment. Step 90 in the first embodiment is not executed, and when an affirmative determination is made in step 40, or when step 70 or 80 is completed, the LKA control proceeds to step 85. Upon completion of step 85, after steps 95 and 105 are executed, step 115 is executed instead of step 110 in the first embodiment. Further, the steering assist torque control is executed in accordance with the flowchart shown in FIG. 5 as in the first embodiment.

In step 85, a target lateral acceleration Gyt is calculated as a target turning state quantity of the vehicle necessary for running the vehicle 18 along the target trajectory in the same manner as in step 62 in the first embodiment. Further, the target steered angle θlkat for trajectory control is calculated based on the target lateral acceleration Gyt of the vehicle and a vehicle speed V in the same manner as in step 64 in the first embodiment.

In step 95, a target change amount Δθlkat of the steered angle θ is calculated as a difference (θlkat−θ) between the target steered angle θlkat and the current steered angle θ.

Figure 20G:
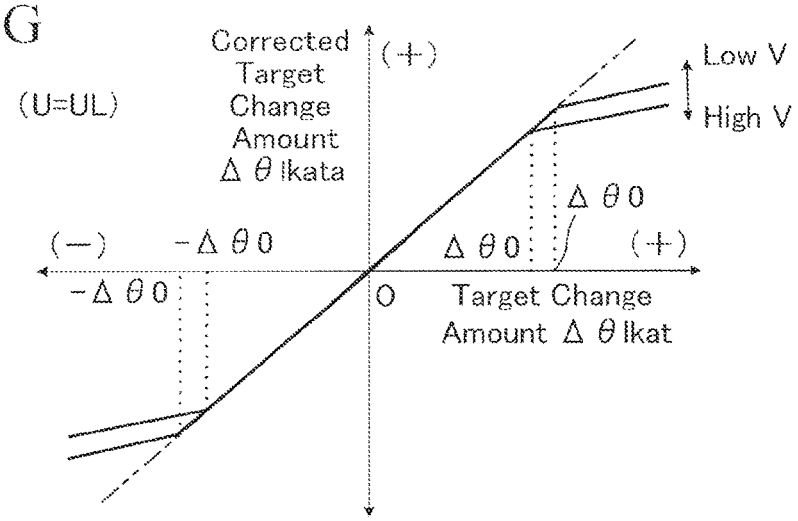
FIGS. 20G to 20I are diagrams showing maps for calculating a corrected target change amount Δθlkata of a steered angle θ for the cases where the forward urgency degree U is the low urgency (UL), the medium urgency (UM) and the high urgency (UH), respectively.
Figure 20H:
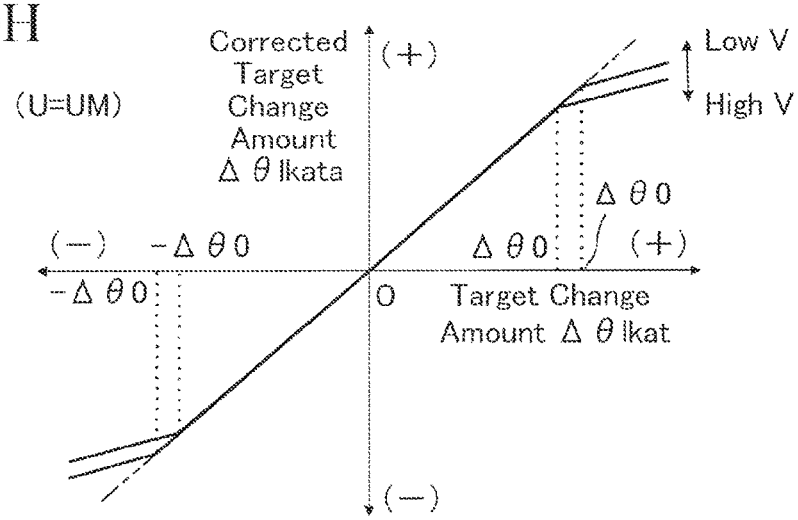
Figure 20I:
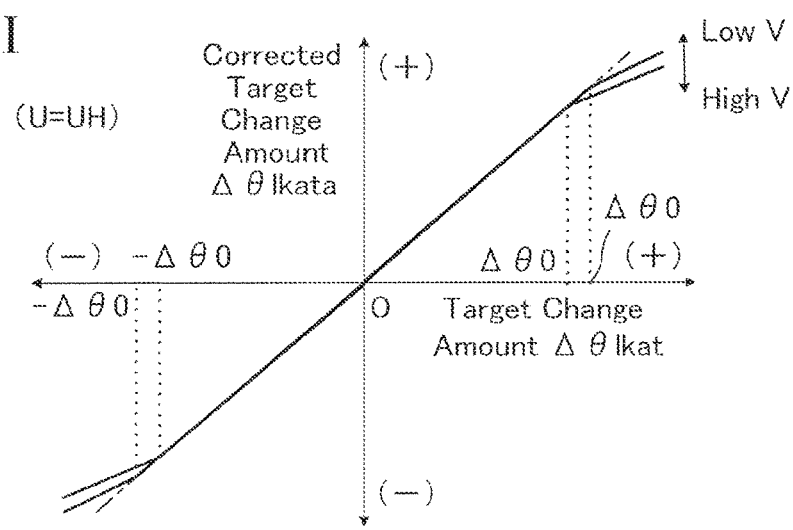

In step 105, a map for correcting the target change amount Δθlkat is selected from the maps shown in FIGS. 20G to 20I according to the forward urgency degree U determined in step 80. Further, by referring to the selected map on the basis of the target change amount Δθlkat, a corrected target change amount Δθlkata is calculated.

As shown in FIGS. 20G to 20I, in the range where an absolute value of the target change amount Δθlkat is equal to or less than a reference value Δθ0 (a positive value) of the target change amount, the corrected target change amount Δθlkata is the same as the target change amount Δθlkat. However, in the range where an absolute value of the target change amount Δθlkat exceeds the reference value Δθ0, the corrected target change amount Δθlkata is calculated such that its absolute value is smaller than the absolute value of the target change amount Δθlkat. The absolute value of the reference value Δθ0 decreases as a vehicle speed V increases and increases as the forward urgency degree U increases and the degree to which the corrected target change amount Δθlkata decreases with respect to the target change amount Δθlkat increases as a vehicle speed V increases, and decreases as the forward urgency degree U increases. Notably, in the range where a magnitude of the target change amount Δθlkat exceeds the reference value Δθ0, the corrected target change amount Δθlkata may be a constant value.

In step 115, a steering torque Tds of the LKA control is calculated as a steering assist torque necessary for changing the steered angle θ by the corrected target change amount Δθlkata by a PID compensation calculation based on the corrected target change amount Δθlkata.

According to the second embodiment, a target steered angle θlkat of the trajectory control is calculated in step 85 irrespective of the state of the steering by the driver and the forward urgency degree U. In step 95, a target change amount Δθlkat of the steered angle θ is calculated. When the steering by the driver is ended during the execution of the LKA control and the forward urgency degree U is determined, a map for correcting the target change amount Δθlkat in step 105 is selected from the maps shown in FIGS. 20G to 20I based on the forward urgency degree U. Further, by correcting the target change amount Δθlkat according to the selected map, a corrected target change amount Δθlkata is calculated. As shown in FIGS. 20G to 20I, the decrease correction amount in magnitude by the correction of the target change amount Δθlkat is larger as an absolute value of the target change amount Δθlkat is larger, and the magnitude reduction degree by the correction of the target change amount Δθlkat is smaller as the forward urgency degree U is higher.

Therefore, when an absolute value of the target change amount Δθlkat exceeds the reference value, the magnitude of the target change amount Δθlkat is reduced based on the target change amount Δθlkat. Consequently, when the absolute value of the target change amount Δθlkat at the end of the steering by the driver exceeds the reference value, the magnitude of the target change amount Δθlkat can be reduced, which enables to moderate the change of the steered angle of the front wheels 20FL and 20FR that is controlled based on the target change amount Δθlkat. Since the reduction amount of the target change amount Δθlkat increases as the absolute value of the target change amount Δθlkat increased, the reduction amount of the target change amount Δθlkat can be increased as the absolute value of the target change amount Δθlkat is larger. Therefore, while preventing the target change amount Δθlkat from unnecessarily decreasing in a situation where the absolute value of the target change amount Δθlkat is small, it is possible to effectively moderate the change of the steered angle of the front wheels 20FL and 20FR in a situation where the absolute value of the target change amount Δθlkat is large.

When the forward urgency degree U is the low urgency (UL), the target change amount Δθlkat is corrected using the map shown in FIG. 20G having a large magnitude reduction degree. Therefore, it is possible to effectively reduce the magnitude of the corrected target change amount Δθlkata and the magnitude of the target steering torque Tds when an absolute value of the target change amount Δθlkat is larger than the reference value Δθ0. Therefore, it is possible to effectively reduce the moving speed of the vehicle 18 in the lateral direction, and effectively reduce the risk of the occupant of the vehicle feeling uncomfortable.

On the other hand, when the forward urgency degree U is the high urgency (UH), the target change amount Δθlkat is corrected using the map shown in FIG. 20I having a small magnitude reduction degree. As a result, the magnitude of the corrected target change amount Δθlkata and the magnitude of the target steering torque Tds are larger as compared to where the forward urgency degree U is the low urgency (UL). Therefore, it is possible to efficiently move the vehicle 18 in the lateral direction while reducing the possibility that the occupant(s) of the vehicle may feel uncomfortable, so that the traveling route 100 of the vehicle can be made to coincide with the target trajectory 102 quickly. Consequently, even when a curvature ρ of the target trajectory after the running road of the vehicle coincides with the target trajectory is large, it is possible to effectively control the vehicle to travel along the target trajectory.

When the forward urgency degree U is the medium urgency (MH), the degree of reduction of the magnitude of the target change amount Δθlkat by the correction is intermediate between the degree when the forward urgency degree U is the low urgency (UL) and the degree when the forward urgency degree U is high urgency (UH). Therefore, the travel route of the vehicle is intermediate between the route indicated by the solid line arrow in FIG. 18 and the route indicated by the broken line arrow in FIG. 18.

In particular, according to the second embodiment, as shown in FIGS. 20G to 20I, the magnitude reduction degree by the correction of the target change amount Δθlkat is larger as a vehicle speed V is higher. Therefore, in a low vehicle speed range where the possibility of deterioration of the stability of the vehicle is low even if the running state of the vehicle 18 is changed by the control of the steered angle of the front wheels by the LKA control, it is possible to effectively control the vehicle to travel along the target trajectory. Conversely, in the high vehicle speed range, by effectively reducing the magnitude of the corrected target change amount Δθlkata and the magnitude of the target steering torque Tds, the change in the running condition of the vehicle by the LKA control can be moderated, and it is possible to effectively reduce the possibility that the stability of the vehicle is reduced due to the LKA control.

Figure 21:
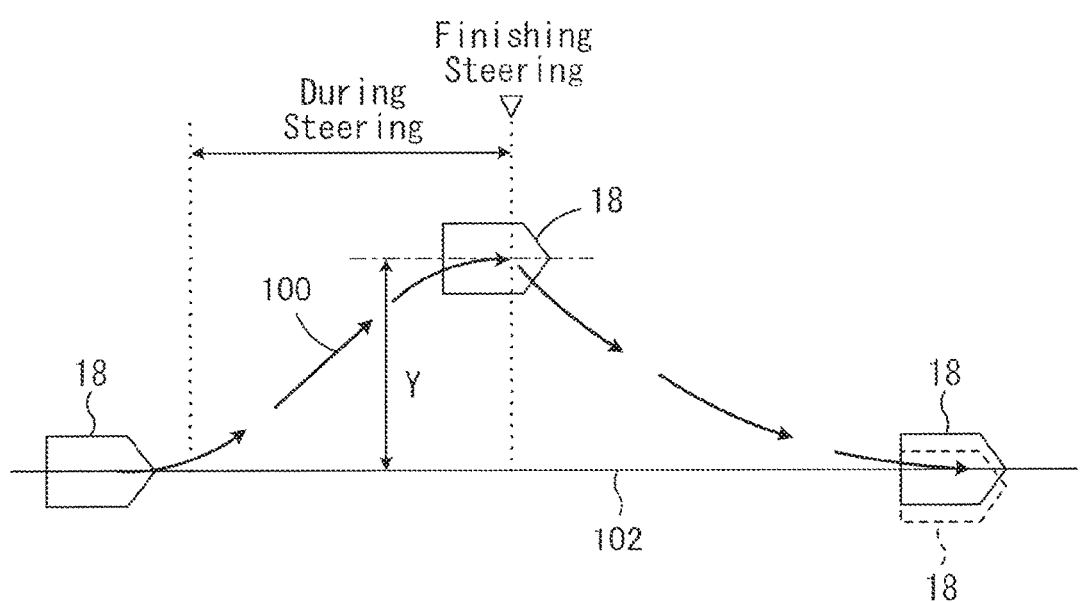
FIG. 21 is an explanatory diagram showing the control of a lateral deviation Y of a vehicle according to a second embodiment in comparison with a conventional case.

According to the second embodiment, as in the first embodiment, even when the lateral deviation Y and the yaw angle deviation φ increase due to steering by a driver, even after the steering is completed, it is possible to make the running trajectory of the vehicle coincide with the target trajectory while reducing the change in magnitude of the deviation Y and the yaw angle deviation φ. In this case, the magnitude of the target change amount Δθlkata of the steered angle is reduced and corrected, whereby the change in magnitude of the steered angle is reduced. Therefore, as shown by a broken line in FIG. 21, the traveling route of the vehicle 18 at the time when the termination condition is satisfied may deviate slightly from the target trajectory 102. However, it is possible to reliably reduce the possibility that the occupant(s) of the vehicle may feel uncomfortable due to the excessive rapid rotation of the steering wheel 22.

In the second embodiment, the corrected target change amount Δθlkata is calculated by referring to the maps shown in FIGS. 20G to 20I based on the target change amount Δθlkat. However, the corrected target change amount Δθlkata may be calculated by a function of the target change amount Δθlkat and a vehicle speed V.

Third Embodiment

Figure 22:
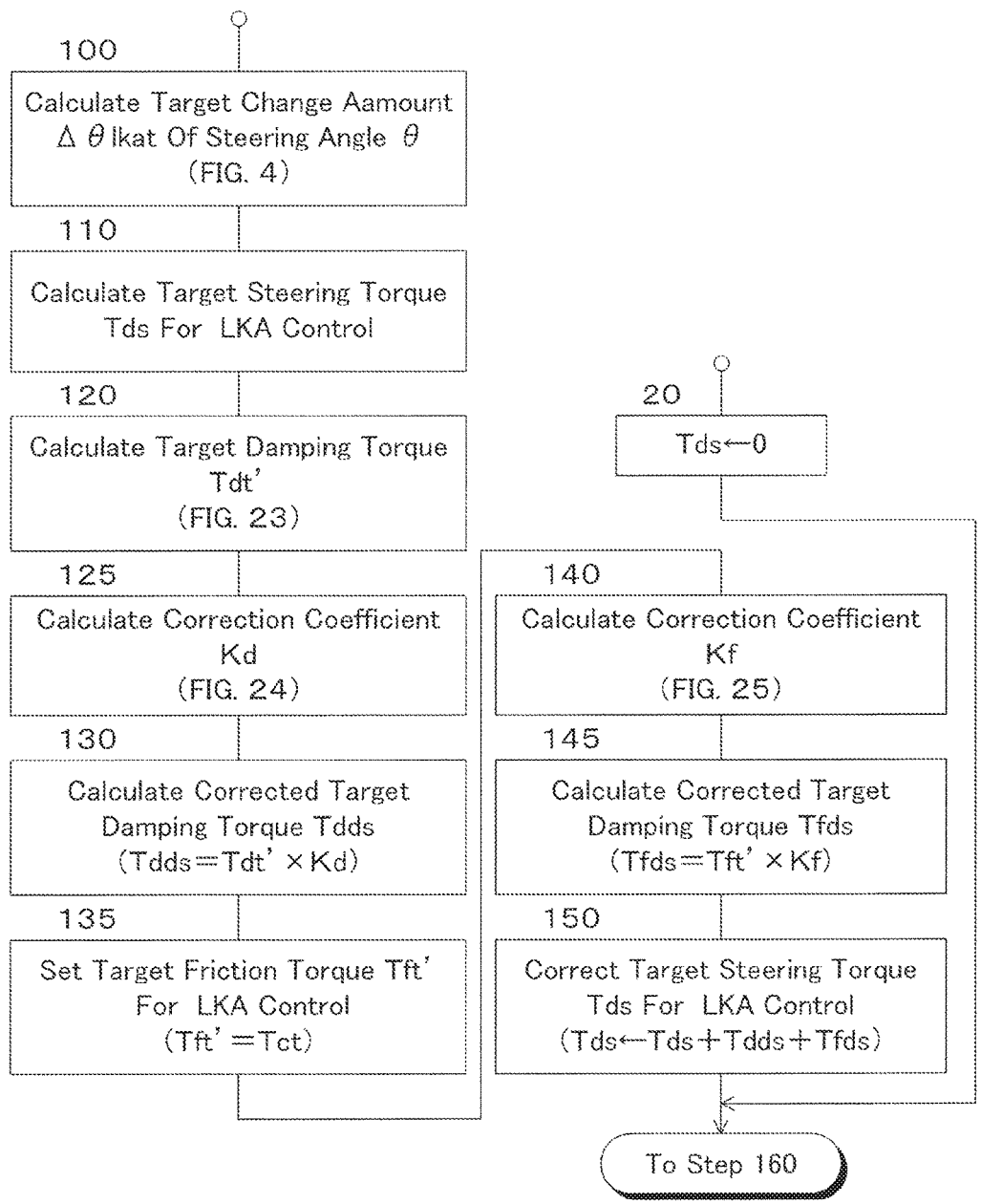
FIG. 22 is a flowchart showing a main part of an arithmetic control routine of a target steering torque Tds for LKA control in the third embodiment.

FIG. 22 is a flow chart showing the main part of the calculation control routine of the target steering torque Tds for the LKA control in the third embodiment.

In the third embodiment, steps 10 to 80, 100 and 110 are executed in the same manner as in the first embodiment. Step 90 in the first embodiment described above is not executed, and when an affirmative determination is made in step 40, or when step 70 or 80 is completed, the LKA control proceeds to step 100. Furthermore, also in the third embodiment, the steering assist torque control is executed in accordance with the flowchart shown in FIG. 5 as in the first embodiment.

Upon completion of step 110, the LKA control proceeds to step 120. In step 120, for example, the steering angular velocity θd is calculated as a time differential value of the steered angle θ, and the map shown in FIG. 23 is referred to based on the steering angular velocity θd and the vehicle velocity V, whereby a target damping torque Tdt' which is one of the controlled variables against steering of the front wheels by the LKA control is calculated. The target damping torque Tdt' increases as a vehicle speed V increases and increases as the absolute value of the steering angular velocity θd increases when an absolute value of the steering angular velocity θd is less than a reference value θd0' (a positive value), and when an absolute value of the steering angular velocity θd is equal to or larger than the reference value θd'0, the target damping torque is calculated to be a constant value.

In step 125, a map for calculating a correction coefficient Kd according to the forward urgency degree U determined in step 80 is selected from the maps shown in FIGS. 24J to 24L. By referring to the selected map based on an absolute value of the lateral deviation Y, a correction coefficient Kd is calculated. When an absolute value of the lateral deviation Y is less than a first reference value Yd1 (a positive value), the correction coefficient Kd is 0. When an absolute value of the lateral deviation Y is equal to or larger than a second reference value Yd2 (a positive value larger than Yd1), the correction coefficient Kd is a maximum constant value. When an absolute value of the lateral deviation Y is equal to or larger than the first reference value Yd1 and less than the second reference value Yd2, the correction coefficient Kd increases as the absolute value of the lateral deviation Y increases in the range from 0 to less than the maximum value. The first reference value Yd1 and the second reference value Yd2 decrease as the forward urgency degree U increases and the maximum value decreases as the forward urgency degree U increases. However, at least one of the first reference value Yd1 and the second reference value Yd2 may be constant.

In step 130, a corrected target damping torque Tdds is calculated as a product (Tdt'×Kd) of the target damping torque Tdt' and the correction coefficient Kd.

In step 135, the target additional friction torque Tct calculated in step 233 of the flowchart shown in FIG. 6 is set to the target friction torque Tft', which is one of the controlled variables against the steering of the front wheels by the LKA control. The target friction torque Tft' may be calculated to a value different from the target additional friction torque Tct in the same manner as the calculation manner of the target additional friction torque Tct.

Figure 25M:
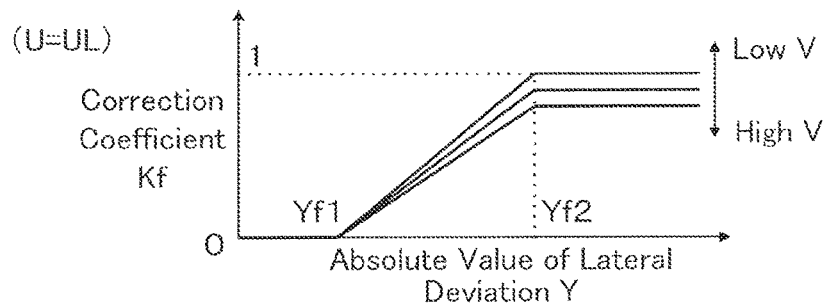
FIGS. 25M to 25O are diagrams showing maps for calculating a correction coefficient Kf for a target friction torque Tft' for LKA control based on an absolute value of a lateral deviation Y of the vehicle and a vehicle speed V for the cases where the forward urgency degree U is the low urgency (UL), the medium urgency (UM) and the high urgency (UH), respectively.
Figure 25N:
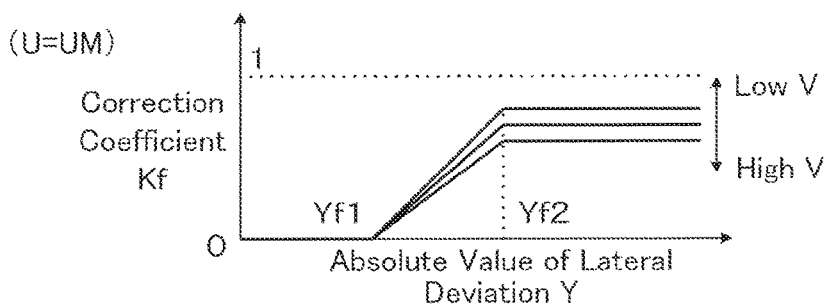
Figure 25O:
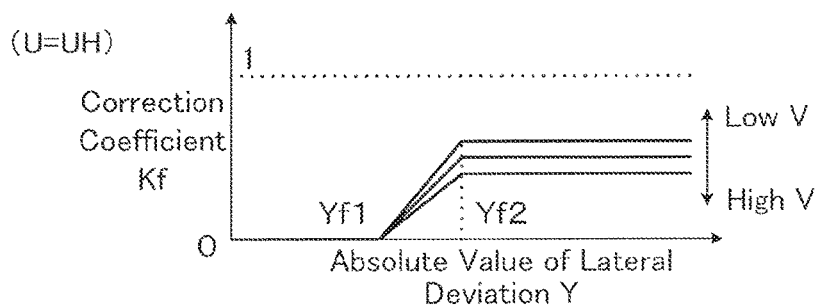

In step 140, a map for calculating a correction coefficient Kf according to the forward urgency degree U determined in step 80 is selected from the maps shown in FIGS. 25M to 25O. By referring to the selected map based on an absolute value of the lateral deviation Y, a correction coefficient Kf is calculated. When an absolute value of the lateral deviation Y is less than a first reference value Yf1 (a positive value), the correction coefficient Kf is 0. When an absolute value of the lateral deviation Y is equal to or larger than a second reference value Yf2 (a positive value larger than Yf1), the correction coefficient Kf is a maximum constant value. When an absolute value of the lateral deviation Y is greater than or equal to the reference value Yf1 and less than the second reference value Yf2, the correction coefficient Kf increases as an absolute value of the lateral deviation Y increases in the range from 0 to less than the maximum value. The first reference value Yf1 and the second reference value Yf2 decrease as the forward urgency degree U increases and the maximum value decreases as the forward urgency degree U increases. However, at least one of the first reference value Yf1 and the second reference value Yf2 may be constant.

In step 145, a corrected target friction torque Tfds is calculated as a product (Tft'×Kf) of the target friction torque Tft' and the correction coefficient Kf.

In step 150, the target steering torque Tds for the LKA control is corrected to a sum of the target steering torque Tds calculated in step 110, the corrected target damping torque Tdds calculated in step 130, and the corrected target steering torque Tfds calculated in step 145.

According to the third embodiment, a target change amount Δθlkat of the steered angle θ is calculated in step 100 irrespective of the state of steering by a driver and the forward urgency degree U. In step 110, a target steering torque Tds for LKA control is calculated and furthermore, step 120 and the following steps are executed. In particular, in step 120, a target damping torque Tdt' is calculated, and in step 135, a target friction torque Tft' is set.

When the steering by the driver ends during the execution of the LKA control and the forward urgency degree U is determined, in a step 125, a map for calculating a correction coefficient Kd is selected from the maps shown in FIGS. 24J to 24L based on the forward urgency degree U. Based on an absolute value of the lateral deviation Y, the correction coefficient Kd is calculated using the selected map. Further, in step 130, a corrected target damping torque Tdds is calculated as a product of the target damping torque Tdt' and the correction coefficient Kd. As shown in FIGS. 24J to 24L, the degree to which the magnitude of the corrected target damping torque Tdds is increased by the correction coefficient Kd increases as an absolute value of the lateral deviation Y increases. The degree by which a magnitude of the corrected target damping torque Tdds is reduced by the correction coefficient Kd is larger as the forward urgency degree U is higher.

Further, in step 140, a map for calculating a correction coefficient Kf is selected from the maps shown in FIGS. 25M to 25O based on the forward urgency degree U. Based on an absolute value of the lateral deviation Y, a correction coefficient Kf is calculated using the selected map. Further, in step 145, a corrected target friction torque Tfds is calculated as a product of the target friction torque Tft' and the correction coefficient Kf. As shown in FIGS. 25M to 25O, the degree to which the magnitude of the corrected target friction torque Tfds is increased by the correction coefficient Kf increases as an absolute value of the lateral deviation Y increases. The degree by which a magnitude of the corrected target damping torque Tfds is reduced by the correction coefficient Kf is larger as the forward urgency degree U is higher.

The correction coefficients Kd and Kf become positive when the absolute value of the lateral deviation Y exceeds the reference values Yd1 and Yf1, respectively, and increase as the absolute value of the lateral deviation Y increases. Therefore, while preventing the force to steer the front wheels 20FL and 20FR from becoming unnecessarily small in a situation where the absolute value of the lateral deviation Y is small, it is possible to effectively reduce the increase in force to steer the front wheels and thereby effectively reduce the magnitude of the time change rate of the steered angle of the front wheels.

When the forward urgency degree U is the low urgency (UL), the correction coefficients Kd and Kf become larger values than when the forward urgency degree U is the high urgency (UH). Therefore, a magnitude of the corrected target damping torque Tdds and a magnitude of the corrected target friction torque Tfds become large, and a magnitude of the drag torque with respect to the change in the steered angle of the front wheels 20FL and 20FR by the target steering torque Tds becomes large. Therefore, it is possible to effectively reduce a lateral movement speed of the vehicle 18 after the driver's steering is ended, and effectively reduce the risk that occupant(s) of the vehicle may feel uncomfortable.

On the other hand, when the forward urgency degree U is high urgency (UH), the correction coefficients Kd and Kf are small. Therefore, a magnitude of the corrected target damping torque Tdds and a magnitude of the corrected target friction torque Tfds are reduced, and a magnitude of the drag torque with respect to the change in the steered angle of the front wheels 20FL and 20FR by the target steering torque Tds becomes small. Consequently, it is possible to efficiently move the vehicle 18 in the lateral direction while reducing the possibility that the occupant(s) of the vehicle may feel uncomfortable, so that a travel route of the vehicle can be made to coincide with the target trajectory quickly. Therefore, even when a curvature ρ of the target trajectory after the running road of the vehicle coincides with the target trajectory is large, the vehicle can effectively be controlled to travel along the target trajectory.

When the forward urgency degree U is the medium urgency (MH), the correction coefficients Kd and Kf are intermediate between the value when the forward urgency degree U is the low urgency (UL) and the value when the forward urgency degree U is high urgency (UH). Therefore, the traveling route of the vehicle is, for example, intermediate between the route indicated by the solid line arrow in FIG. 18 and the route indicated by the broken line arrow in FIG. 18.

In particular, according to the third embodiment, as shown in FIGS. 24J to 24L and FIGS. 25M to 25O, the correction coefficients Kd and Kf are smaller as a vehicle speed V is higher. Therefore, in a low vehicle speed range where the possibility of deterioration of the stability of the vehicle is low even if the running state of the vehicle 18 is changed by the control of the steered angle of the front wheels by the LKA control, the vehicle can effectively be controlled to travel along the target trajectory. Conversely, in a high vehicle speed range, by effectively reducing a magnitude of the corrected target change amount Δθlkata and a magnitude of the target steering torque Tds, the change in the running condition of the vehicle by the LKA control can be made moderate, and it is possible to effectively reduce the possibility that the stability of the vehicle may be decreased due to the LKA control.

The correction coefficient Kd is calculated based on the lateral deviation Y using the map shown in FIGS. 24J to 24L and the correction coefficient Kf is calculated based on the lateral deviation Y using the map shown in FIGS. 25M to 25O. However, at least one of the correction coefficients Kd and Kf may be calculated based on the yaw angle deviation φ, or may be calculated based on both the lateral deviation Y and the yaw angle deviation φ.

In the first to third embodiments described above, even when steering is being performed by the driver, if a magnitude of the deviation between an index value of a target running state of the vehicle and an index value of an actual running state is larger, a magnitude of the target steering torque Tds for the LKA control is decreasingly corrected, or a drag torque is generated. Therefore, in a situation where a magnitude of the deviation between the index value of the target running state of the vehicle and the index value of the actual running state is larger it is possible to reduce a magnitude of the steering torque T when a driver steers than in a case where decrease correction etc. of the magnitude of the target steering torque Tds is not performed.

However, as in the following first to third modifications, a magnitude of the target steering torque Tds may be reduced or a drag torque may be generated only after the driver's steering is ended. In these modification examples, it is as well possible to moderate the change in the steered angle of the steerable wheels to reduce the possibility that the occupant(s) of the vehicle may feel uncomfortable due to a sudden change in the running state of the vehicle.

First Modified Example

Figure 26:
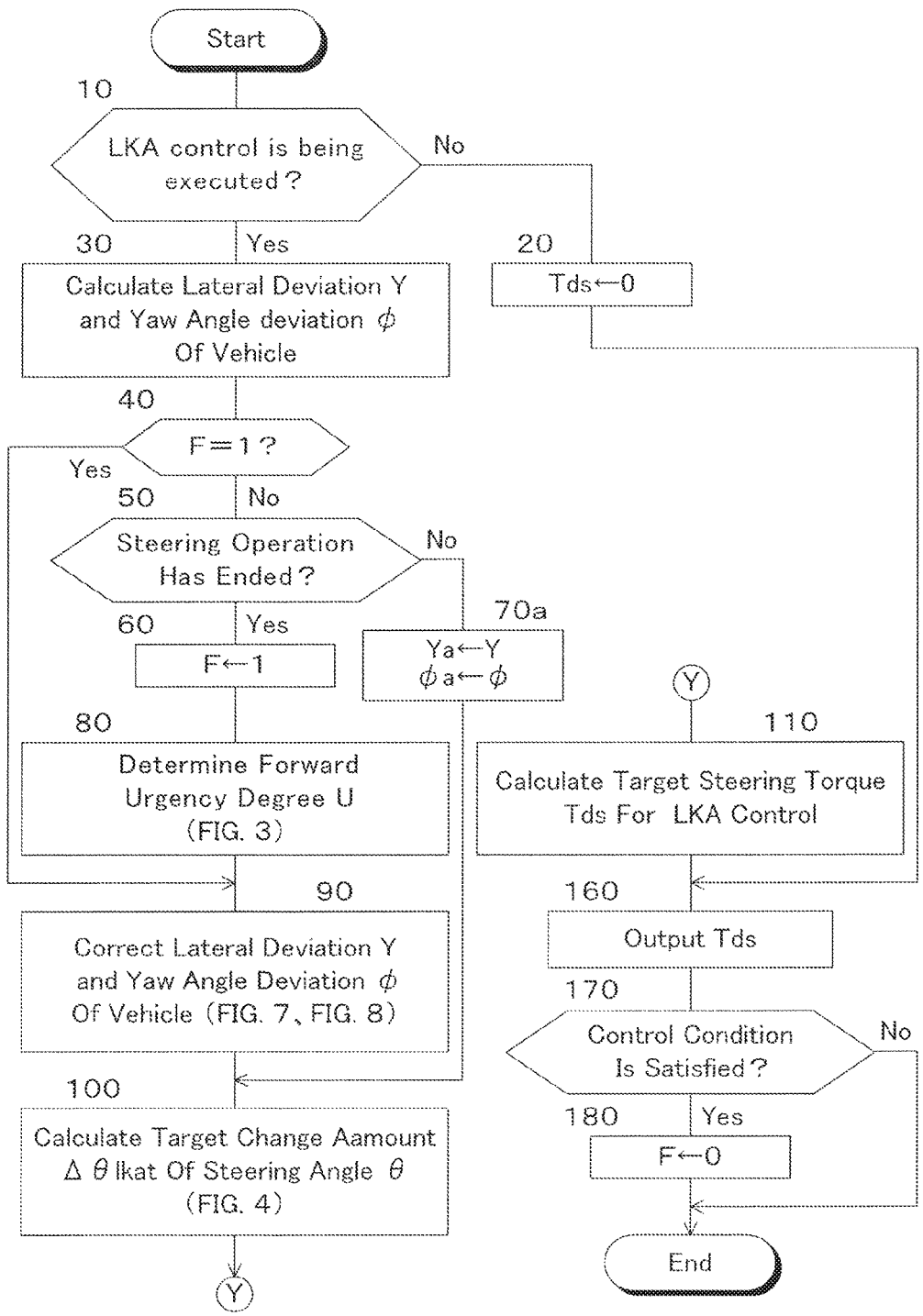
FIG. 26 is a flowchart showing an arithmetic control routine of a target steering torque Tds for LKA control in a first modification example corresponding to the first embodiment.

FIG. 26 is a flowchart showing a calculation control routine of a target steering torque Tds of the LKA control in the first modified example corresponding to the first embodiment.

In the first modified example, when a negative determination is made in step 50, a corrected lateral deviation Ya and a corrected yaw angle deviation φ are set to the lateral deviation Y and the yaw angle deviation φ, respectively, in step 70 a, and thereafter the LKA control proceeds to step 100. The other steps are executed in the same manner as in the first embodiment.

Second Modified Example

Figure 27:
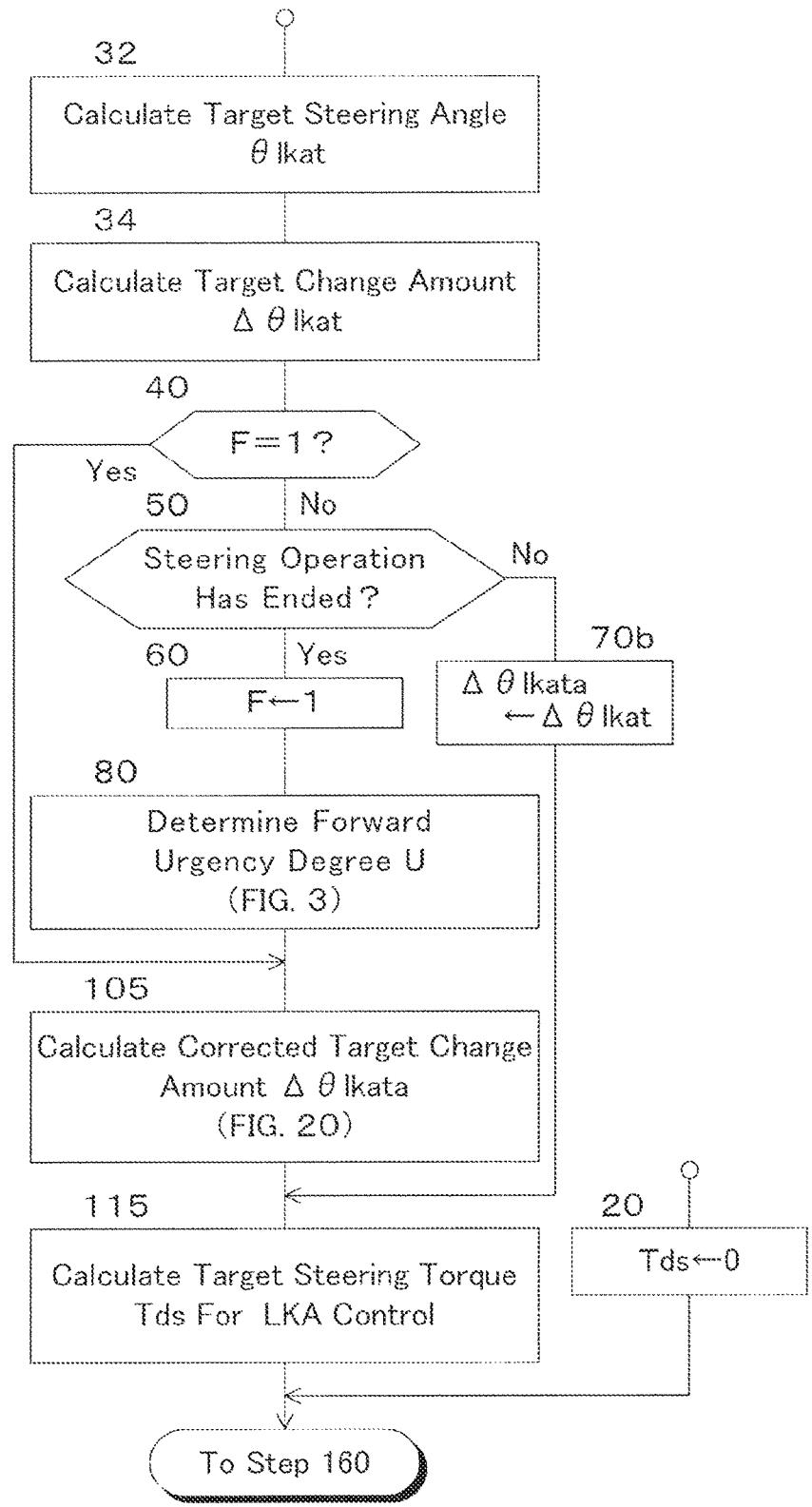
FIG. 27 is a flowchart showing a main part of an arithmetic control routine of a target steering torque Tds for LKA control in a second modification example corresponding to the second embodiment.

FIG. 27 is a flowchart showing the main part of the calculation control routine of the target steering torque Tds of the LKA control in the second modified example corresponding to the second embodiment.

In the second modified example, steps 32 and 34, which correspond to steps 85 and 95 in the second embodiment, respectively, are performed before step 40. When a negative determination is made in step 50, a corrected target change amount Δθlkata is set to the target change amount Δθlkat in step 70b, and thereafter the LKA control proceeds to step 115. The other steps are executed in the same manner as in the first embodiment.

Third Modified Example

Figure 28:
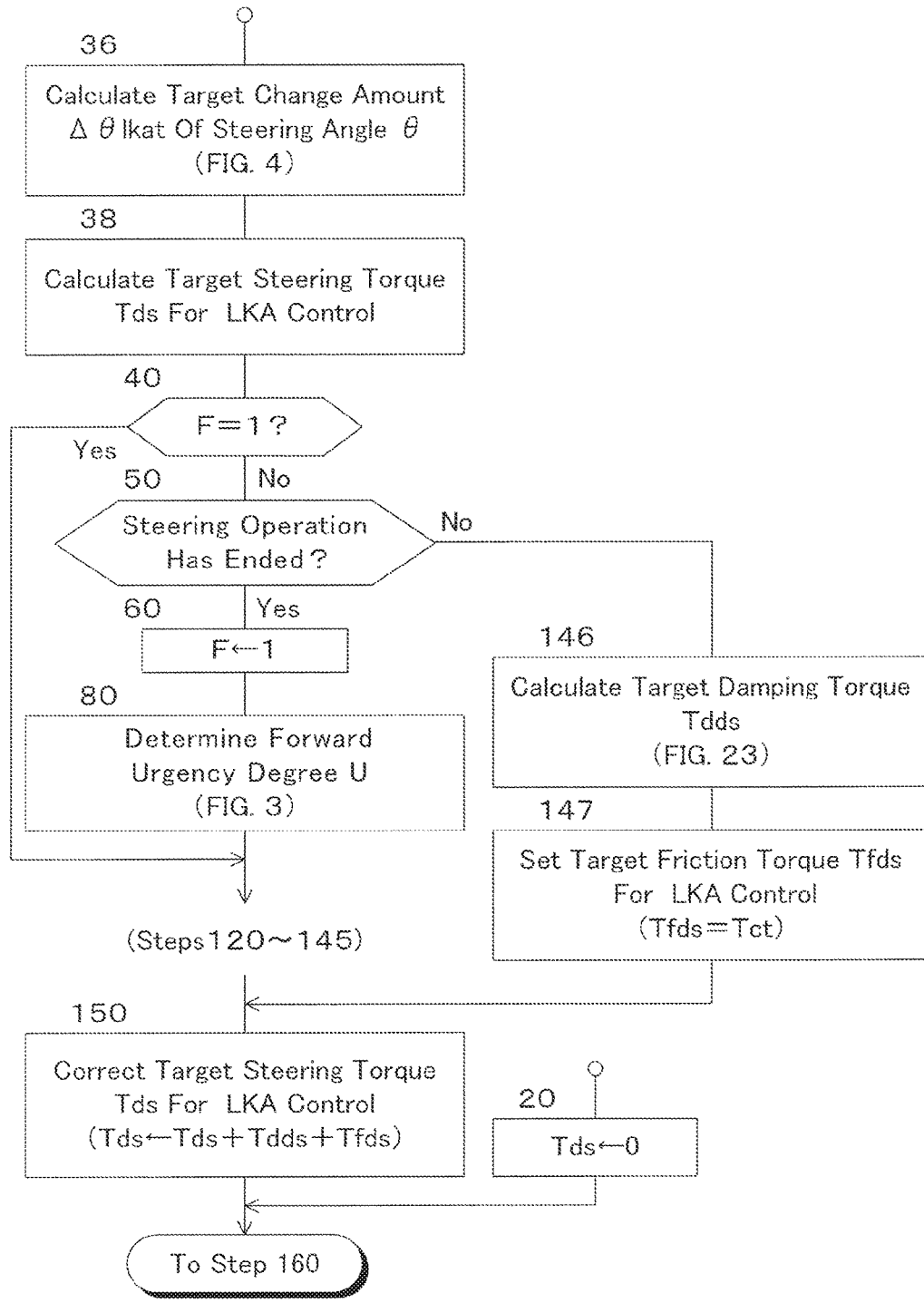
FIG. 28 is a flowchart showing a main part of a calculation control routine of a target steering torque Tds for LKA control in a third modification example corresponding to the third embodiment.

FIG. 28 is a flow chart showing the main part of the calculation control routine of the target steering torque Tds of the LKA control in the third modified example corresponding to the third embodiment.

In a third modification, steps 36 and 38, corresponding respectively to steps 100 and 110 in the third embodiment, are performed before step 40. When a negative determination is made in step 50, steps 146 and 147 are executed, and when step 147 is completed, the LKA control proceeds to step 150. The other steps are executed in the same manner as in the first embodiment.

In step 146, as in step 120 in the third embodiment, reference is made to the map shown in FIG. 23 based on a steering angular velocity θd and a vehicle speed V, thereby a target damping torque Tdds which is one of the controlled variables that resist the steering of the front wheels by the LKA control is calculated.

In step 147, similarly to step 135 in the third embodiment, a target additional friction torque Tct calculated in step 233 of the flowchart shown in FIG. 6 is set to a target friction torque Tfds which is one of the controlled variables against the steering of the front wheels by the LKA control.

According to the first to third modified examples described above, the magnitude of the target steering torque Tds for the LKA control is not decreasingly corrected during steering by a driver, and no drag torque is generated. Therefore, while preventing a change of the steering characteristic due to a decrease correction of the magnitude of the target steering torque Tds or a generation of the drag torque, it is possible to moderate a change of the steered angle of the steerable wheels when the steering by the driver is completed.

Other Modified Examples

In each of the above-described embodiments and modified examples, the forward urgency degree U is determined, and the map is selected according to the determined forward urgency degree. However, the determination of the forward urgency degree U may be omitted. For example, in the first embodiment and the first modified example, step 80 is omitted and a corrected lateral deviation Ya and a corrected yaw angle deviation φa are calculated by referring to the map shown in FIG. 7A and the map shown in FIG. 8D, respectively. In the second embodiment and the second modified example, step 80 is omitted, and in step 105, a corrected target change amount Δθlkata is calculated by referring to the map shown in FIG. 23G. In the third embodiment and the third modified example, step 80 is omitted, a correction coefficient Kd is calculated by referring to the map shown in FIG. 24J in step 125, and a correction coefficient Kf is calculated by referring to the map shown in FIG. 25M in step 140.

According to these other modified examples, the LKA control can be simplified as compared with the above-described corresponding embodiments and modified examples.

Although the present disclosure has been described in detail with reference to specific embodiments, it will be apparent to those skilled in the art that the present disclosure is not limited to the above-described embodiments and that various other embodiments are possible within the scope of the present disclosure.

For example, in each of the above-described embodiments and modified examples, the index values of the running state of the vehicle are the lateral deviation Y and the yaw angle deviation φ, but one of them may be omitted.

In each of the above-described embodiments and modified examples, a map is selected according to the determined forward urgency degree U, and the corrected lateral deviation Ya or the like is calculated by referring to the selected map. However, a correction coefficient Ku for correcting the lateral deviation Y etc. may be calculated based on the determined forward urgency degree U, and a corrected lateral deviation Ya etc. may be calculated as a product of the lateral deviation Y etc. and the correction coefficient Ku.

In each of the above-described embodiments, in the determination of the forward urgency degree U in step 80, the third time point T3 is set as the time point at which the second time ΔT2 elapses from the second time point T2. However, the third time point T3 may be modified to be set as a time point at which the vehicle travels a predetermined distance from the position of the second time point T2.

In each of the above-described embodiments, the routine for calculating and controlling the target steering torque Tds for the LKA control according to the flowcharts shown in FIGS. 2, 19 and 22 is achieved by the running control unit 16. However, at least a part of the routine for calculating and controlling the target steering torque Tds may be modified so as to be achieved by the EPS control unit 14, and both of the routine for calculation control of the target steering torque Tds and the routine for controlling the steering assist torque shown in FIG. 5 may be modified to be accomplished by one control unit.

Also, the above-described first to third embodiments may be implemented in combination, and the above first to third modified examples may be implemented in combination, and any one of the first to third embodiments may be implemented in combination with any one of the first to third modified examples.

Furthermore, in each of the above-described embodiments and modified examples, the steering device is not provided with a steering transmission ratio variable device that relatively rotates the steering shaft on the side of the pinion shaft 34 with respect to the steering shaft on the side of the steering wheel 22. However, the driving support apparatus of the present disclosure may be applied to a vehicle provided with a steering transmission ratio variable device for a steering device. In that case, the target angle θpt of the pinion shaft 34 may be calculated as the target value of the LKA control by the running control unit 16. Furthermore, a target steered angle θt may be calculated as θpt−Δθr, where Δθr is a relative rotation angle of the steering shaft on the side of the pinion shaft 34 by the steering transmission ratio variable device with respect to the steering shaft on the side of the steering wheel 22.

What is claimed is:

1. A driving support apparatus for a vehicle comprising:
a steering device configured to steer steerable wheels, and
a control unit configured to:
   execute a running control in which a steered angle of the steerable wheels is changed by controlling the steering device so that a running state of the vehicle with respect to a running road conforms to a target running state;
   calculate a deviation between an index value of a target running state of the vehicle and an index value of an actual running state;
   calculate, based on the deviation of the index values, a target change amount of the steered angle of the steerable wheels, and
   control the steering device so that a change amount of the steered angle of the steerable wheels conforms to the target change amount, wherein
   the control unit is configured to limit a magnitude of a time change rate of the steered angle of the steerable wheels that is changed by the running control when one of the magnitude of the deviation of the index values and the magnitude of the target change amount of the steered angle exceeds an associated reference value after a steering operation of a driver is ended.

2. The driving support apparatus for a vehicle according to claim 1, wherein the control unit is configured to calculate the target change amount of the steered angle based on a deviation of the index values whose magnitude is decreasingly corrected when a magnitude of the deviation of the index values exceeds a reference value of the deviation, and wherein the decrease correction amount of the magnitude of the deviation of the index values increases as the magnitude of the deviation of the index values increases.

3. The driving support apparatus for a vehicle according to claim 2, wherein the decrease correction amount of the magnitude of the deviation of the index values is larger as a vehicle speed is higher.

4. The driving support apparatus for a vehicle according to claim 1, wherein the control unit is configured to decreasingly correct a magnitude of the target change amount of the steered angle based on the target change amount when the magnitude of the target change amount of the steered angle exceeds a reference value of the target change amount, and wherein the decrease amount of the magnitude of the target change amount of the steered angle is larger as a magnitude of the target change amount of the steered angle is larger.

5. The driving support apparatus for a vehicle according to claim 4, wherein the decrease correction amount of the magnitude of the target change amount of the steered angle is larger as a vehicle speed is higher.

6. The driving support apparatus for a vehicle according to claim 1, wherein the steering device is configured to generate a driving force for steering the steerable wheels and a drag force resisting steering of the steerable wheels, wherein the control unit is configured to control the steering device based on the deviation of the index values so that, during execution of the running control, a magnitude of the driving force for steering the steerable wheels is increased as a magnitude of the deviation of the index values increases, and to control the steering device so that when a magnitude of the deviation of the index values exceeds the reference value of the deviation, the magnitude of the drag force is larger than that when the magnitude of the deviation of the index values is equal to or smaller than the reference value of the deviation, and wherein a magnitude of the drag force increases as a magnitude of the deviation of the index values increases.

7. The driving support apparatus for a vehicle according to claim 6, wherein the steering device is a power steering device configured to steer the steerable wheels by generating a steering assist torque, and wherein the control unit is configured to control a magnitude of at least one of a damping torque and a friction torque which are drag force components of the steering assist torque based on the deviation of the index values.

8. The driving support apparatus for a vehicle according to claim 1, wherein the control unit is configured to limit the magnitude of the time change rate of the steered angle of the steerable wheels that is changed by the running control when a magnitude of the deviation of the index values exceeds the reference value of the deviation during a period from the end of the driver's steering until a preset termination condition is satisfied during execution of the running control.

9. The driving support apparatus for a vehicle according to claim 1, wherein the control unit is configured to acquire information on a running road, to set a target trajectory of the vehicle based on the information on the running road, and to calculate as the index value at least one of a lateral deviation of the vehicle with respect to the target trajectory and a yaw angle deviation which is an angle between the target trajectory and a longitudinal direction of the vehicle.

10. The driving support apparatus for a vehicle according to claim 1, wherein the control unit is configured to acquire information on a running road, to set a target trajectory of the vehicle based on the information on the running road, to estimate as a first curvature a curvature of a target trajectory at a position where the vehicle exists at a first time point at which the steering operation is completed when the driver's steering operation is terminated during execution of the running control, to estimate as a second curvature one of a curvature of the target trajectory at the position at which the vehicle is estimated to exist at a third time point after a predetermined time has elapsed from a second time point at which it is estimated that the magnitude of the deviation of the index values is equal to or less than an ending reference value and a curvature of the target trajectory at an estimated position where the vehicle is present at a fourth time point at which the vehicle travels a predetermined distance from the second time point, and to reduce a degree of the limit on the magnitude of the time change rate of the steered angle of the steerable wheels as a magnitude of a difference between the second and the first curvatures is larger.

* * * * *